United States Patent
Hanson

(10) Patent No.: US 8,594,839 B2
(45) Date of Patent: *Nov. 26, 2013

(54) HUMAN EMULATION ROBOT SYSTEM

(76) Inventor: David F. Hanson, Dallas, TX (US)

( * ) Notice: Subject to any disclaimer, the term of this patent is extended or adjusted under 35 U.S.C. 154(b) by 1669 days.

This patent is subject to a terminal disclaimer.

(21) Appl. No.: 11/465,710

(22) Filed: Aug. 18, 2006

(65) Prior Publication Data

US 2007/0038331 A1    Feb. 15, 2007

Related U.S. Application Data

(63) Continuation of application No. 10/862,809, filed on Jun. 7, 2004, now Pat. No. 7,113,848.

(60) Provisional application No. 60/477,310, filed on Jun. 9, 2003.

(51) Int. Cl.
| | |
|---|---|
| G06F 19/00 | (2011.01) |
| G05B 19/04 | (2006.01) |
| G05B 19/18 | (2006.01) |
| G05B 15/00 | (2006.01) |
| G05B 19/00 | (2006.01) |

(52) U.S. Cl.
USPC .......................... 700/245; 700/253; 700/258

(58) Field of Classification Search
USPC ............. 700/245, 253, 258; 521/79; 717/150, 717/160; 428/15, 39, 35.7, 36, 92, 36.92, 428/346, 399; 600/30, 36, 503; 604/93.01, 604/332, 338, 342, 344; 606/132, 187, 229; 607/32, 35, 56, 57, 60, 91, 95, 123
See application file for complete search history.

(56) References Cited

U.S. PATENT DOCUMENTS

| | | | | |
|---|---|---|---|---|
| 3,841,020 | A | * 10/1974 | Ryan et al. | 446/190 |
| 4,076,656 | A | 2/1978 | White et al. | 260/2.5 |
| 4,177,589 | A | * 12/1979 | Villa | 40/457 |
| 4,209,939 | A | * 7/1980 | Pittala | 446/267 |
| 4,481,001 | A | 11/1984 | Graham et al. | 434/267 |
| 4,825,136 | A | * 4/1989 | Farhat | 318/568.1 |
| 5,176,560 | A | * 1/1993 | Wetherell et al. | 446/175 |
| 5,176,625 | A | * 1/1993 | Brisson | 604/8 |
| 6,060,530 | A | 5/2000 | Chaouk et al. | 521/64 |
| 6,072,496 | A | 6/2000 | Guenter et al. | 345/419 |
| 6,391,233 | B1 | 5/2002 | Otani et al. | 264/49 |
| 7,113,848 | B2 | * 9/2006 | Hanson | 700/245 |
| 7,186,212 | B1 | * 3/2007 | McMullen | 600/38 |
| 2003/0110540 | A1 | 6/2003 | Fukui et al. | 901/50 |
| 2004/0254771 | A1 | 12/2004 | Reiner et al. | 703/7 |

OTHER PUBLICATIONS

Gomi, et al., "Elements of artificial emotion," IEEE, pp. 265-268, 1995.

(Continued)

*Primary Examiner* — Khoi Tran
*Assistant Examiner* — Nicholas Kiswanto
(74) *Attorney, Agent, or Firm* — Baker Botts L.L.P.

(57) ABSTRACT

A robot system comprising a flexible artificial skin operable to be mechanically flexed under the control of a computational system. The system comprises a first set of software instructions operable to receive and process input images to determine that at least one human likely is present. The system comprises a second set of software instructions operable to determine a response to a perceived human presence, whereby the computational system shall output signals corresponding to the response, such that, in at least some instances, the output signals cause the controlled flexing of the artificial skin.

20 Claims, 15 Drawing Sheets

(56) References Cited

OTHER PUBLICATIONS

Hara, et al., "Real-time facial interaction between human and 3D face robot agent," IEEE, pp. 401-409, 1996.

Fumiya Iida, Harumi Ayai, Fumio Hara, "Behavior learning of a face robot using human natural instruction," Proc. of 4th Robotics Symposia, 6 pgs., 1999.

Yuji, et al., "A new multifunctional tactile sensing technique by selective data processing," IEEE, pp. 1091-1094, 2000.

Bischoff, et al., "Improving dependability of humanoids," IEEE, pp. 1-8, 2001.

* cited by examiner

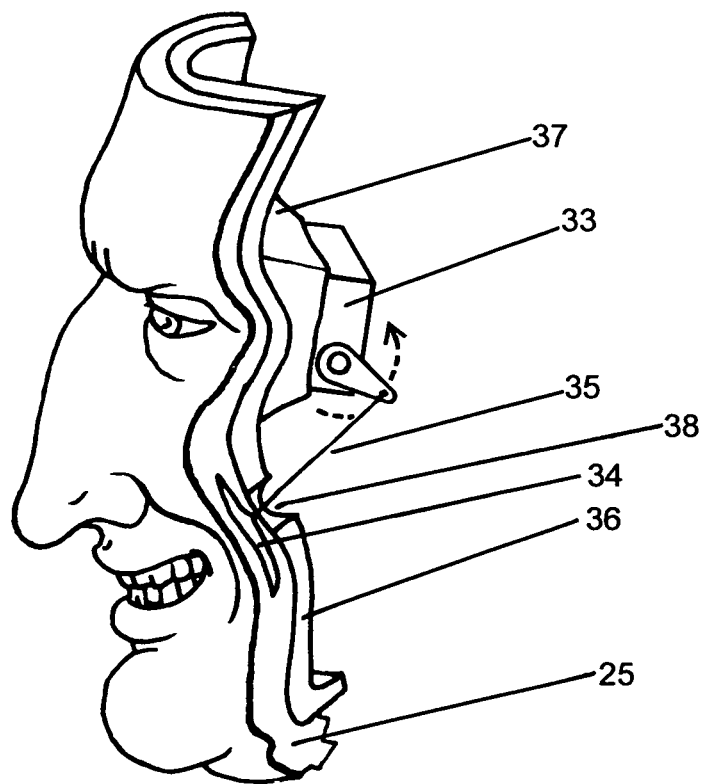
Fig. 5a
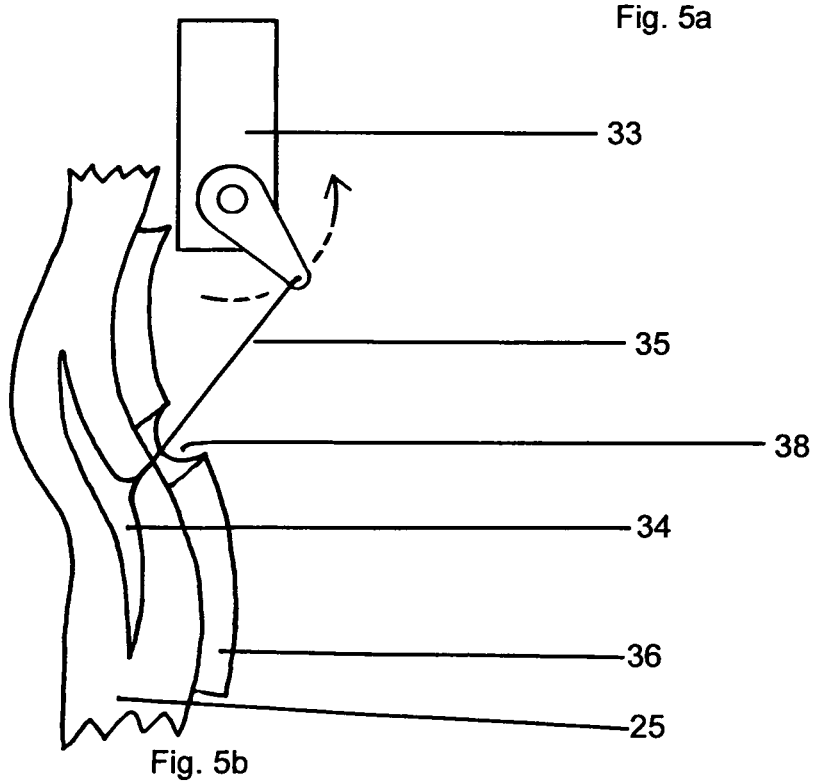
Fig. 5b
FIG.5

HUMAN EMULATION ROBOT SYSTEM

RELATED APPLICATIONS

This application is a continuation of U.S. application Ser. No. 10/862,809, filed Jun. 7, 2004 entitled "Human Emulation Robot System."

PRIORITY CLAIM

This application claims the benefit (e.g. 35 U.S.C. §119(e)) of U.S. Provisional Application No. 60/477310, which was filed on Jun. 9, 2003.

TECHNICAL FIELD OF THE INVENTION

This invention relates generally to robotics and more particularly to a robot and system to emulate human behavior.

BACKGROUND OF THE INVENTION

The means by which people use a computer may be referred to as a Human Computer Interface (HCI). An HCI generally comprises output device(s) such as a monitor screen or printer, input device(s) such as a keyboard, touch screen, tablet, scanner, or mouse. Existing robots generally suffer from various disadvantages. For example, existing robots may not have realistic looking and acting artificial skin. Other robots may not be capable of realistically producing appropriate facial expressions or other nonverbal communications.

SUMMARY OF THE INVENTION

One aspect of the invention is a robot system comprising a flexible artificial skin operable to be mechanically flexed under the control of a computational system. The system comprises a first set of software instructions operable to receive and process input images to determine that at least one human likely is present. The system comprises a second set of software instructions operable to determine a response to a perceived human presence, whereby the computational system shall output signals corresponding to the response, such that, in at least some instances, the output signals cause the controlled flexing of the artificial skin.

The invention has several important technical advantages. Embodiments of the invention may have none, some, or all of these technical advantages without departing from the scope of the invention. The invention provides a more naturalistic mechanism to interact with various electronic devices. By providing artificial skin with at least some characteristics of human skin, the invention facilitates more accurate emulation of human facial expressions and/or gestures. Another important technical advantage is that the invention may allow perception of the emotional state of a human with which a robot is interacting and a simulated emotional response by the robot to better facilitate interaction between the robot and a human.

BRIEF DESCRIPTION OF THE DRAWINGS

For a more complete understanding of the present invention and the advantages thereof, reference is now made to the following descriptions taken in conjunction with the accompanying drawings in which:

FIG. 5 illustrates one embodiment of expression affector, a system by which expressive movement may be affected in a skin.

DETAILED DESCRIPTION OF THE DRAWINGS

Figure 1:
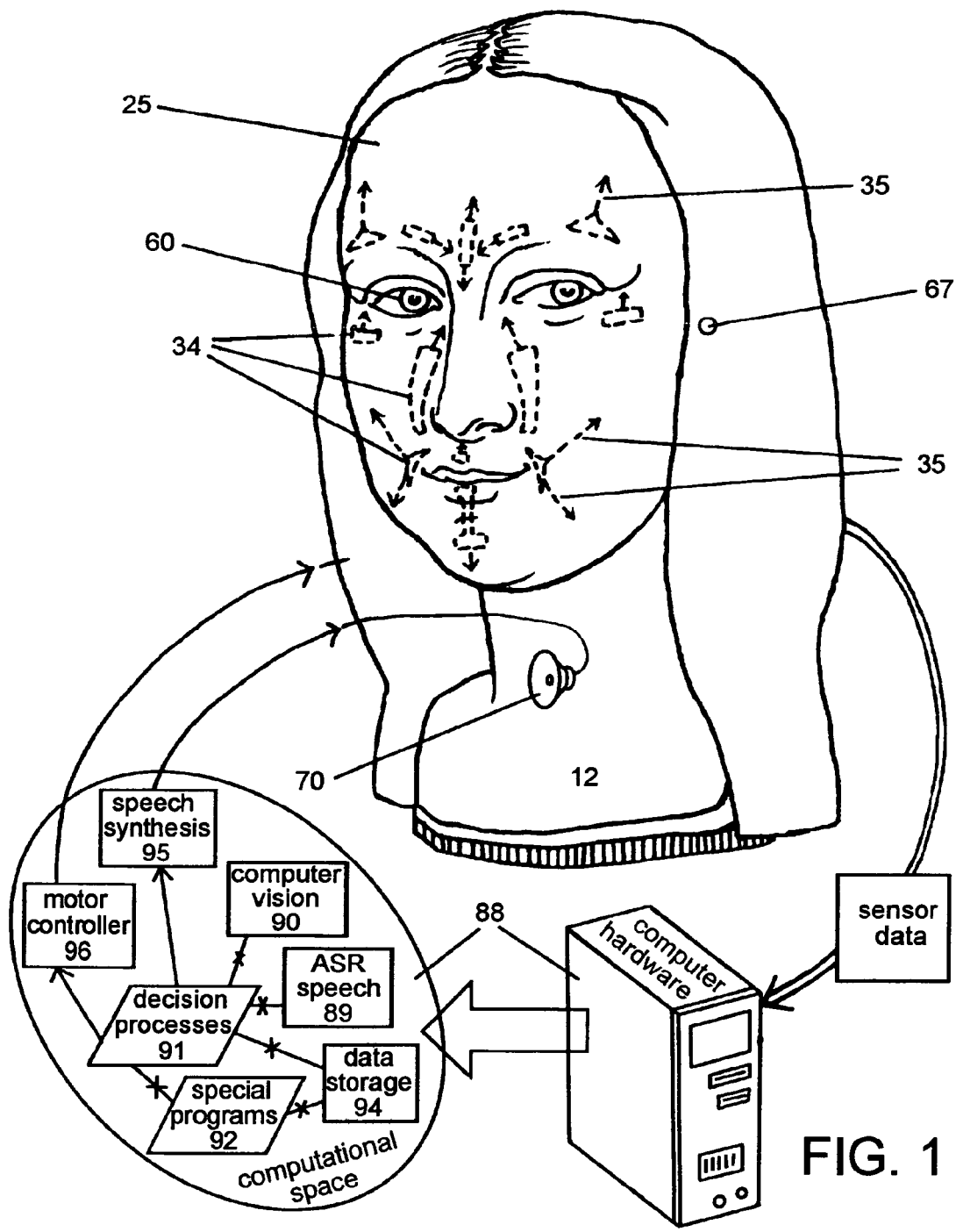
FIG. 1 illustrates one embodiment of a Human Emulation Robot as a whole system.

The preferred embodiment of the present invention and its advantages are best understood by referring to FIGS. 1 through 15 of the drawings, like numerals being used for like and corresponding parts of the various drawings.

One aspect of the invention is an HCI system called a Human Emulation Robot (HER), comprising electromechanical emulation of at least some naturally-occurring structures, patterns, and/or codes associated with human communications, in order to generate human-computer interactions that may be more innately intelligible and comforting to humans than previous HCI systems. In one embodiment, an HER comprises apparatus and/or software for an HER to sense and perceive at least some natural non-verbal human communication signals, apparatus and/or software for an HER to decide meaningful responses to sensory perceptions, and apparatus and/or software for an HER to emulate, at least in part, natural human communicative output. To sense and perceive natural human communication signals, the HER may employ (without limitation) face-tracking machine vision, audio-sensing, facial biometrics, electronic chemical sensing (smell), and touch sensing. Other hardware and/or software systems may also be used. To decide meaningful responses to sensory perceptions, the HER may employ any, all, or none of Expert Knowledge Systems, Automatic Speech Recognition systems, Natural Language Processing systems, Chatterbots, logical reasoning systems, and/or statistical reasoning systems. Other related systems may also be used. To emulate human communicative output, the HER may employ synthesized spoken language and a physically embodied, 3D mechanical face that is humanlike in appearance and that may display at least some realistic human aesthetic structures, facial expressions, and/or gestures.

An HER may be advanced by the coordinated integration of other display (or other output) technology in addition to said physically-embodied, three-dimensional mechanical face. In some embodiments, this additional output technology may supplement the naturalistic communication with conventional computer graphics and text, sound, etc. Technology that produces various smells may also be used. Technology that produces tactile sensations may also be used. Technology that produces bodily gestures and/or locomotion may also be used.

The description below presents many other options that may be associated with the HER of the invention. The description below also presents a number of other structures, methods, compositions of matter, etc., each of which may constitute a separate invention.

Before describing the drawings in more detail, the following description will provide some additional overview information concerning various embodiments and aspects of the invention disclosed herein. The description below discusses various options for various aspects of the HER and its use. Nothing herein is intended to be essential to the invention or limit the invention in some way not specified in the claims of any issued patent based upon this description.

Flexible tissues may be emulated in an HER by using ynya flexible elastomeric artificial skin of any suitable substance(s); here and hereafter "skin" shall refer to the material emulation of human or animal soft tissues. Facial expressions in an HER may be produced by any suitable means, including but not limited to means described in this patent. Any suitable actuator technology (such as, for example, servomotor, shape memory alloy, or electroactive polymer (EAP) actuator) may be used anywhere an actuator is described this patent, and anywhere an actuator is used in HER systems. All actuators described in use in this patent may be servomotors, although they are not required to be so. Whenever linkages are required to interconnect skin to an actuator or actuation system, any suitable material such as, for example, cable, thread, braided nylon, kevlar, carbon fiber, or rod may be used; these linkages shall hereafter be referred to as "linkage". Such linkage may be composed of one, two, or more pieces interconnected (such as, for example, by rotating joints) as desired, which may convert rotational or other motion into linear or other motion as desired.

The invention may include a series of novel mechanical systems that may improve a facial expression mechanism by lowering complexity, cost, weight, and power requirements, such that the system may be made more effectively mobile, battery-powered, and/or mass-produced. The Human Emulation Robot system itself may use one, some, all, or none of the described mechanical systems.

The invention may include a mechanical system that comprises a rigid, hollow frame (hereafter called mechanical frame) that is used to support various subsystems of a facial-expression display device, such that the mechanical frame may serve multiple simultaneous functions. A mechanical frame may be composed of any suitable substantially rigid material, formed into a hollow shell of approximately uniform thickness. The mechanical frame may support multiple structures and systems simultaneously, which may include skin, facial expression actuators, and/or electronics. The multiplicity of function in a mechanical frame may improve the economy of space, mass, and cost of the manufactured system. Structures of a mechanical frame may emulate aspects of the human skull so that when the mechanical frame is covered with an elastomeric artificial-skin that is actuated to affect facial expressions, the artificial-skin will interact with the frame to form at least some facial expressions that closely resemble those of humans.

The invention may include a system for producing a mechanical frame that is approximately anatomically correct relative to an existing face-form, which may achieve more lifelike expressive deformations in the artificial skin. This system may utilize forensics data as reference for skin thicknesses, and notate these thicknesses with depth markers inside the face-form; such face-form may be the interior of a mold of a face-like form, or the interior of a face-like 3D computer-model. A skull-like form may then be modeled based upon the depth of the markers (in inverse proportion) inside the face-form. This represents a use of "facial reconstruction" techniques employed by homicide investigators to reconstruct a face from a skull. Here, the technique is used in reverse, to reconstruct a skull from a face. The resulting structure may also be used as an interior form when molding the skin, so that the skin thicknesses are approximately anatomically correct, and so the skin may fit well onto the mechanical frame.

The invention may include a mechanical system, hereafter called "eye mechanism", that may be used to affect at least some natural-appearing motion in artificial eyes. In the eye mechanism, artificial-eyes may pivot on points located upon the vertical axes of said eyes. Substantially rigid struts may connect said points to a substantially rigid frame (hereafter called "eye frame"), such that said struts and eye frame together keep the said vertical axes (at least approximately) in parallel. Other substantially rigid struts may connect the eye frame to a hinge mounted on a larger mechanical frame, such that the hinge pivots about a horizontal axis that intersects (at least approximately) the center of both said artificial-eyes. Thus the vertical axes intersect said horizontal axis at the (at least approximate) center of each artificial eye, thus ensuring proper ball-like rotational behavior of said eyes relative to the mechanical frame. One or two of any suitable actuators may then affect the rotation of the artificial-eyes about their vertical axes; and any suitable actuator may be used to affect the rotation of the entire eye mechanism around said horizontal axis of the hinge. To endow a Human Emulation Robot with vision, one may also embed video sensors within the artificial eyes. Video sensors may be excluded or embedded in other areas of the HER without departing from the scope of the invention.

The invention may include a mechanical system that endows human-appearing mechanical devices and tele-robots with vision within realistic-looking eyes. This system may comprise human-appearing artificial eyes, means for affecting movements of said artificial eyes, video sensors embedded within said human-appearing artificial-eyes, and means for relaying these images to a controlling processor or a human operator.

The invention may also include a mechanical system that may be used to affect the appearance of the dynamic action of the human eyelids, and that shall hereafter be called "eyelid mechanism". Curved bands or shells of substantially rigid or semi-rigid material (hereafter referred to as "bands") may be embedded in the part or parts of the skin that resembles eyelids. Such bands may be used for upper-lid or for lower lid, or for both. If two bands are used in conjunction to comprise both upper and lower lids, then as the curved bands follows the forms of the lids, the bands may cross near the corners of the eyes, whereat the curved bands may be attached together with a joint for stabilization. One or both of these joints may also attach to a mechanical frame for additional stabilization. The portions of the curved bands that then extend past the corners may continue into the interior space behind the eyes, such that they may operate as levers to be pulled or pushed up or down by actuators, causing the lids to correspondingly open or close. Alternate means may be used to affect motion in the curved bands, such as, for example, linkages that attach to the center of the curved bands and lead to actuators, so that when actuated, the linkages thereby pull or push the lids open and closed.

The invention may also include a mechanical system for mechanically affecting expressions that represent any, all, or none of the dynamics of various human facial features and facial expressions, and shall hereafter be called "expression affector". Expression affector comprises a skin made to resemble one or more features of the human face, flexible anchor(s) that are composed of any suitable material such as rubber or cloth that is embedded within or otherwise attached to the skin to distribute force through the skin, and linkage(s) that connect an anchor and/or skin to any suitable actuation system. The actuation system affects motion via the linkage into the skin, possibly via an anchor, pulling or pushing the skin in a manner that may emulate the actions of the human facial muscles when producing facial expressions and/or speech. Linkages may connect to anchors by any suitable means, such as, for example, sewing with thread, gluing, and/or hooking with a barbed projection.

The present invention also relates to several embodiments of expression affector, which emulate particular facial actions. One embodiment of the expression affector may emulate the appearance of the dynamical pattern of the human smile, affecting action similar to that of the human Zygomaticus Major muscles, moving the corners of the mouth upwards and outwards. Another embodiment of the expression affector may emulate the appearance of the dynamical pattern of the human frown, affecting action similar to that of the human Triangularis muscles, pulling the corners of the mouth downward. Another embodiment of the expression affector may emulate the appearance of the dynamical pattern of the human sneer, by affecting action similar to that of the human Caninus, Levator labii, and Quadratus Labii Superiorus muscles, pulling the skin upward along the sides of the nose. Another embodiment of the expression affector may emulate the appearance of the dynamical pattern of the human brow-furrow, by affecting action similar to that of the human Corrugator tissue, pulling the artificial forehead skin from above the eyebrows inward toward the center of the forehead. Another embodiment of the expression affector may emulate the appearance of the dynamic action of the human eyebrow, by affecting action similar to that of the outer portions of the human Frontalis muscle. Another embodiment of the expression affector may emulate the appearance of the dynamical pattern of the human eye-squint during the action of smiling, by affecting action similar to that of the human Orbicularis Oculi muscles and the outer portions of the human Quadratus Labii Superiorus muscle, the movements of which cause the portions of cheek just below the outer corners of the eyes to raise up towards the eye. Another embodiment of the expression affector may emulate the appearance of certain dynamical patterns of the human lower lip caused by the action of the human Depressor Labii Inferioris muscles.

The invention may include a mechanical system, hereafter called "sliding affector", that may be used to affect motion in skin, comprising a substantially rigid linkage that extends from an actuator through a slot that is a gap in the body of a mechanical frame, to attach to the skin, such that the slot guides and channels the motion of the linkage, and thus, controls motion of the skin. Inside and outside the slot, the linkage may be flanged, so that one flange and perhaps a second flange may prevent the linkage from slipping through the slot. Such a flanged linkage may be made in two separate flanged pieces that are inserted from opposing sides of the slot during manufacturing, so that the pieces adhere together, locking the linkage into the slot. In one embodiment, this system may be used to emulate the motion of the center portion of the human forehead that is caused by the Frontalis muscle, which moves the central brow upward into the forehead, and/or that is caused by the human Procerus muscle, which pulls the forehead down into a scowl.

The invention may include a mechanical system (hereafter called "lip mechanism") for affecting with approximate realism, the appearance of certain dynamical patterns of the human upper or lower lip. An elastomeric artificial skin-material may be cast into a form that approximates a mouth and chin. An anchor, composed of any suitable material such as rubber or cloth, may be embedded within the skin of the upper or lower lip to distribute force through the skin, to prevent said skin-material from tearing, and/or to improve aesthetic performance. A substantially rigid linkage, composed of any suitable substance, interconnects said anchor and an actuator in order to affect motion. This linkage may extend vertically down from the lip to the chin for actuating the lower lip (or vertically upwards from the lip into space behind the nose for the upper lip), whereat the linkage bends to enter the interior of the face to attach to the actuator. At this bend, a rotating joint may fasten said linkage to a second substantially rigid linkage, which may be attached or embedded in the artificial skin of the chin for the lower lip. Said second linkage itself may also extend into the interior of the face to be moved by an actuator, such that, for the lower lip, it may affect an up-down motion within the artificial skin of the chin. Because the two linkages are fastened together, said first linkage may be made to transmit this up-down motion into the lip (upward into the lower lip, or downward into the upper lip). Said first linkage, rotating as a lever about the joint where it meets said second linkage, may also then affect an additional in-and-out motion to the lip when moved by another actuator. Alternate means may be used for affecting the in-out motion of the lip without departing from the scope of the invention, such as, for example, a "bimorph" actuation scheme, wherein two linkages that are attached together at their ends, extend vertically into the lip, such that as one linkage changes in length, it pulls or pushes the second linkage, causing the second linkage to bend. Such a bending may push the lip out or pull the lip in. This change in length in the linkage may be caused by any other suitable means, such as, for example: the linkage being pulled or pushed from the interior of the facial cavity, or material change in dimensions of the linkage (such as may occur in piezoelectric or EAP materials).

The invention may emulate the communicative output and communicative sensor-input of the human face, in a system known hereafter as a Human Emulation Display (HED). An HED may, for example, comprise an elastomeric skin, human-appearing artificial eyes, a way to coordinate facial features into at least some human-emulated facial expressions and/or speech-like forms (which may include without limitation a smile, a frown, lower lip motion, forehead movement, eye motion, and jaw motion), a way to visually sense the presence and position of a person or people, a way to sense human spoken language and/or a way to transduce synthetic speech into audible signals. An HER and/or a HED may or may not be attached to a mobile body, and may or may not be endowed with grasping limbs. Alternately, an HER or a HED may be attached to an inanimate body, to no body at all, or to a display-stand. If an HER and/or a HED are attached to an animated artificial body, dynamic gestures in the body, neck, and/or limbs may be used to enhance the communicative function of the HER and/or the HED.

Another aspect of the invention that, may, but need not, be used for the skin of an HER is a polyurethane elastomer material (hereafter called Skin Rubber) that may be advantageous by offering the desirable properties of both a flexible foam elastomer and a solid elastomer. This Skin Rubber comprises a freshly catalyzed Poly(urethane-urea) elastomer (a suitable mixture of a diol and a diisocyanate, that cures into a high-molecular weight oligomer, may work, for example "SkinFlex"-a product sold by the BJB company) that is introduced by mixing (while said elastomer is still liquid and not yet fully cured) into a freshly catalyzed Poly(urethane-urea) foaming elastomer (a suitable Polyurethane foam rubber may work, for example "Flex-foam-it"-a product also sold by the Smooth-On company) that is also still liquid and curing, the resulting mix curing to become the Skin Rubber polymer material. A ratio of between 15% foam to 85% elastomer, and 50% foam to 50% elastomer may be used. The resulting Skin Rubber may be a highly stable composition that alternates between discrete, microscopic sections of nearly pure elastomer and discrete sections of foaming elastomer. In such instances, the material is easily compressed because it is permeated by gas-bubble voids, but remains highly elastic because of the action of areas or even networks of elastomer.

Another aspect of the invention may include embodiments of Skin Rubber used as an artificial skin, such as may or may not be used in applications including but not limited to anatomical models, prosthetics, toys, and human-like robotics. Skin Rubber may also be used for application embodiments other than artificial soft tissues, such as, for example (but without limitation): seat cushions, apparel, mechanical compositions of locomotion devices (wherein Skin Rubber may be advantageous by functioning as a spring and dampener), and various aerospace applications.

Another aspect of the invention that, may, but need not, be used for the skin of an HER is an elastomer material composition (hereafter called Skin Rubber 2) that may be advantageous by offering the desirable properties of both a compressible, flexible foam elastomer and a solid elastomer. Skin Rubber 2 may also be used for application embodiments other than artificial soft tissues, such as, for example (but without limitation): seat cushions, apparel, mechanical compositions of locomotion devices (wherein Skin Rubber may be advantageous by functioning as a spring and dampener), and various aerospace applications. Skin Rubber 2 may be achieved by building a matrix of material that may be removed later in the process. Any suitable material may be used to compose this matrix such as, for example: wax, styrene, sugar, or mechanical tooling elements such as, for example: metal rods that slide together to interlock in a grid-like mold-matrix. The matrix material may be made into a matrix structure by any suitable means, such as, for example: automated deposition manufacturing, by stacking as blocks, and/or by self-assembly of structures from shaken, loose particles. If this matrix is made of separate units of material, the units may be adhered by any suitable means, such as, for example: by steeping in solvent or glue, or by partial thermo-melting. Once the material matrix is built, any suitable elastomer, such as, for example, room-temperature vulcanizing (RTV) silicone, may be saturated into the matrix and allowed to cure. Once the elastomer is cured, the matrix material can then be removed by any suitable means that may include solvent-melting, thermo-melting, or bio-consumption (such as, for example, consumption by microbes or beetles). The material removal may be assisted by pressurized gas or liquid, or by vacuum. The removal of the material matrix may leave voids in place of the matrix, effectively resulting in a web of elastomer that may act like a foam, as the voids are analogous to the gas-bubbles in a flexible foam that allow the collapse and compression that is characteristic of such foam. In such instances, the Skin Rubber 2 may be easily compressible in the manner of a flexible foam, while maintaining the elastic elongation characteristics of the elastomer. Alternately, because the matrix may be precisely engineered and constructed, structures may be made to exist within the Skin Rubber 2 that are more elaborate and controlled than the bubbles of a foam. Such controlled structures may include (without limitation): manifolds for controlling the flow of gasses or fluids, folding structures that cause the Skin Rubber 2 to collapse or elongate into surprising forms under stresses, and structural reinforcements or buttressing, The structure of the matrix may exist at a variety of scales, from macroscopic to microscopic and below. The smaller-scales may enable many new elastomeric structures for Micro Electrical Mechanical Systems (MEMS), and/or for nanometer scale systems and devices. Various devices may be embedded into the matrix, so as to become subsequently embedded within the Skin Rubber 2; such devices may include (without limitation) sensors, anchors, actuators, and/or electronics, Another aspect of the invention may include embodiments of Skin Rubber 2 used as an artificial skin, such as may or may not be used in applications including but not limited to anatomical models, prosthetics, toys, and human-like robotics.

Other aspects of the invention may include a number of applications of an HER, some of which are described below.

Various embodiments of an HER may enable a human to use naturalistic communication to access, navigate, and/or modify the information present on computer networks, which may or may not include, but shall not be limited to, the following: the Internet, the World Wide Web (WWW), Wi-Fi, P2P (peer to peer), and/or Grid computing networks. Furthermore, embodiments of an HER may be used to access, navigate, and/or modify the information present on computers, computational processors and/or information storage devices. Embodiments of an HER may be used to display the condition of a computer and/or as a replacement for error codes. Embodiments of an HER may be used as an automated assistant to humans, helping to organize and manage human affairs.

Embodiments of an HER may be used to automate customer service functions, which may or may not include without being limited to: drive-through service at fast food restaurants and banks, information kiosks, automatic teller machines, restaurant service in general, sales agents in retail stores, ticketing agents for travel or sports, and sales agents in general. In each of these cases, the HER may be used for one, some, all, or none of the following: (a) to obtain information from the customer as to desired goods or services to purchase, (b) to obtain information from the customer as to what they are purchasing for purposes of calculating the amount of money owed by the customer, (c) obtaining information from the customer as to their method of payment and other relevant payment information (such as, for example, an account number), (d) a good or service for which a customer requires information, (e) obtaining and/or verifying a password or PIN associated with particular goods or services, (f) communicating with the customer concerning any of the foregoing, and (g) performing any other services that may be automated that are currently performed by humans or machines acting in any of the listed roles. Embodiments of an HER may be used as a commercial advertisement display (e.g. as a clothes mannequin), such that the said display may engage a person or people in attentive dialogue, and answer direct questions about the goods or services being advertised. Thus, the HER might also act like an automated sales or marketing representative who seeks to educate consumers and/or sell products to consumers in grocery stores, department stores, malls, other public places, etc. Embodiments of an HER may be used as a promotional or informative display, such that the display may engage a person or people in attentive dialogue about a select subject, and answer direct questions about the topic being promoted or information being disseminated.

Embodiments of an HER may be used as a therapy tool, such that human interaction with said device may have healthful physical, neurological, and/or psychological effects. Embodiments could also be used for automated psychological therapy or as an interactive neurological therapy tool for individuals with social communication disorders. In each of these cases, the HER may be used for one, some, all, or none of the following: (a) to obtain data from the patient regarding patient condition by natural language dialogue, by accessing patient records, by olfactory sensing, tactile sensing, and/or by visual inspection of the patient, (b) to use dialogue with the patient to maintain the attention of the patient, and to elicit information from the patient, (c) to use expert systems database(s) (that may or may not be based on standardized psychology knowledge) and/or various reasoning systems to perform a diagnosis of the patient based on the obtained data, (d) to use naturalistic display and verbalizations to deliver therapeutic interactions, utterances, gestures, and prescriptions for behavior to the patient, (e) to use naturalistic dialogue to deliver assessments of a patient to a human, such as a health-care worker, (f) to interactively train a patient's communicative abilities and related cognitive functions, (g) to perform any other services that may be automated that are currently performed by humans or machines acting in any of the listed roles.

Embodiments of an HER may be used for loneliness alleviation for individuals with limited social contact, such that sociable stimulation may provide healthful benefits. In this case, the HER provides social and/or informative interaction to an individual, and may relay messages to/from healthcare workers and/or family, via a computer network, telephone, or other telecommunication means. Embodiments might be used as a stress reduction device, such that human interaction with said device may comfort a person or ameliorate troubled mental states. In this case, the HER may be used to produce soothing language and gestures to calm the person, in response to detected language and/or behavior of a patient, wherein such response may be decided by an expert system database that may or may not be based upon standard psychology.

Embodiments of an HER may be used as an automated educator, mentor, or tutor. In these cases, the HER may be used for one, some, all, or none of the following: (a) to provide nurturing attention to the pupil, (b) to maintain the attention of the pupil, by varied means that may include games, linguistic and paralinguistic interaction, and/or storytelling, (c) to obtain data from the pupil by natural language dialogue, visual inspection, olfactory (chemical) sensing, and/or accessing records of the pupil, (d) to perform diagnosis and assessment of the pupil, by processing obtained data using expert systems database(s) and reasoning systems that may or may not be based upon standard knowledge of pedagogy and psychology, (e) to use naturalistic display and verbalizations to deliver knowledge, training, encouragement, assignments, and/or commands/suggestions for behavior change to the pupil, (f) to provide to human educators or parents, assessments of a pupil's behavior, performance, and progress (g) to perform any other services that may be automated that are currently performed by humans or machines acting in the listed roles.

Embodiments of an HER may be used as a developmental nurturing tool such as an educational play object, a developmentally-nurturing play device, a developmental therapy device, an automated nanny, and/or an automated developmental therapist, such that sociable interaction with said nurturing tool may provide healthful developmental benefits to children. In these cases, the HER may be used for one, some, all or none of the following: (a) to provide nurturing attention to the child, (b) to maintain the attention of the child, by varied means that may include games and/or storytelling, (c) to obtain data from the child by natural language dialogue, visual inspection, tactile sensing, olfactory (chemical) sensing, and/or accessing records of the child, (d) to perform diagnosis and assessment of the child's data, by using expert systems database(s) and reasoning systems that may or may not be based upon standard knowledge of pedagogy and developmental psychology, (e) to use naturalistic display and verbalizations to deliver knowledge, encouragement, assignments, and/or commands/suggestions for behavior changes to the child, to therapeutically influence the child with interactions, utterances, and/or gestures, and/or to socialize the child, (f) to provide assessments of a child's behavior, developmental performance, and progress to parents, medical personnel, and/or educators (g) to perform any other services that may be automated that are currently performed by humans or machines acting in the listed roles.

Embodiments of an HER may be used as toys such as dolls, novelties, stuffed animals, and/or display devices for video games. In these cases, the HER may be used for one, some, all or none of the following: (a) to maintain the attention of the child, by varied means that may include games, interactive dialogue, and/or storytelling, (c) to obtain data from the child by natural language dialogue, visual inspection, tactile sensing, olfactory (chemical) sensing, and/or accessing records of the child, (d) to perform diagnosis and assessment of the child's data, by using expert systems database(s) and reasoning systems that may or may not be based upon the knowledge of standard pedagogy and developmental psychology, (e) to use naturalistic display and verbalizations to deliver entertainment and/or knowledge to the child, (f) to provide assessments of a child's behavior, development, and/or progress, to parents, and/or educators (g) to connect into a computer network for multi-user games, and/or to access additional knowledge and/or data for enhanced playful function.

Embodiments of an HER may be used as an artistic medium including without limitation automated sculpture, automated actors, interactive automated theater, and/or automated festivity spaces. In these cases, the HER may be used for one, some, all or none of the following: (a) to provide aesthetic, cultural, and/or narrative expression for an artist or artists, (b) to maintain the attention of the viewer by varied means that may include games, linguistic interaction, performance, automated environmental changes, and/or storytelling, (c) to obtain data from a person or people by natural language dialogue, visual inspection, olfactory (chemical) sensing, and/or accessing records, (d) to perform assessment of said data by using expert systems database(s) and/or reasoning systems that may or may not be based upon the knowledge of game theory, psychology, narrative arts, narrative theory, art theory, aesthetic theory, theatrical design and legerdemain, (e) to serve as an interactive portrait medium, (f) to use naturalistic display, verbalizations, and automated environmental changes, to deliver sensory impressions to the viewer, with the objective of cultural or psychoactive effect, (f) to provide recordings and assessments of people's response to the artwork for a supplement to the artwork, for historical posterity, and/or for scientific evaluations, (g) to perform any other services that may be automated that are currently performed by humans or machines acting in the listed roles and art forms.

Embodiments of an HER may be used as interactive automated memorial icons, to memorialize deceased and/or celebrated individuals. In such embodiments, the HER may be used for one, some, all or none of the following: (a) to emulate the appearance of an individual, (b) to emulate the personality of an individual, such as may or may not be characterized by speech patterns, specific gestures, idiosyncratic phrasings, and/or any other distinguishing states or behaviors, (c) to enact words and stories of the portrayed individual, as may be obtained from writings, video recordings, audio recordings, or any other suitable means, (d) to recognize family and friends of the individual by sight and/or by audio, and to greet persons by name and/or with eye contact, (e) to hold personalized interactions with family and friends, recounting stories and events specific to the person(s) with whom the HER interacts, (f) to portray a benevolent entity, such as, for example, an angel, that may offer solace to family and friends visiting the memorial.

Embodiments of an HER may be used to search for missing children, by employing biometric identification software to analyze HER video data. In this case, the HER may be used for one, some, all or none of the following: (a) to captivate a child's attention with an entertaining interaction or performance, so that direct eye-to-camera gaze is obtained from the child (b) to compare captured video images of a child to databased images of missing children, (c) to notify authorities upon the identification of a potential missing child, (d) to use engaging interaction to maintain the attention of the child while authorities are in transit to the site.

Embodiments of an HER may be used to search for wanted individual such as at security checkpoints, by employing biometric identification software to analyze HER video data. In this case, the HER may be used for one, some, all or none of the following: (a) to captivate a subject's attention with an engaging, authoritative interaction, so that direct eye-to-camera gaze is obtained from the subject (b) to compare captured video images of a subject to databased images of wanted individuals, (c) to notify authorities upon the identification of a potential wanted individual.

Embodiments of an HER may be used as a tele-presence device, such that said device displays expressive behavior that is being controlled by a person from some distance away, displaying said expressive behavior to one or more persons. In another tele-presence application, the HER could be used to perform medical examinations on a patient who is isolated or in quarantine, delivering the sense of face-to-face interactions without compromising the quarantine. In these cases, the HER may be used for one, some, all or none of the following: (a) to provide the comforting impression of the three-dimensional presence of a person, (b) to communicate across some distance the expressions of separated parties, (c) to perform any other functions that may be partially automated that are currently performed by humans in face-to-face encounters.

Embodiments of an HER may be used as an automated Medical Diagnosis tool, for obtaining medically relevant information from patient using emulated natural social interaction with patient. In these cases, the HER may be used for one, some, all or none of the following: (a) to provide nurturing attention to the patient, and the soothing impression of the presence of a person, (b) to obtain data from the person by natural language dialogue, auditory inspection, visual inspection, olfactory (chemical) sensing, tactile sensing, temperature sensing, and/or accessing patient records, (c) to perform diagnosis and assessment of said data, by using expert systems database(s) and/or various reasoning systems that may be based upon the standard accumulated knowledge of medicine, (d) to use naturalistic display and verbalizations to deliver to the patient knowledge, diagnosis, prognosis, prescriptions/advice for behaviors, and/or other utterances or gestures to therapeutically influence the patient, (e) to record assessments of a patient's condition, interaction, and/or progress (f) to communicate assessments regarding a patient's condition and/or progress to a medical care worker or professional, by naturalistic dialogue, (g) to perform any other services that may be automated that are currently performed by humans or machines acting in healthcare roles.

Embodiments of an HER may be used as a model for education and/or reference, which may include without limit to: interactive anatomical models, interactive medical reference models and/or models for demonstrating principles of psychology, social sciences, and/or cognitive science. In these cases, the HER may be used for one, some, all or none of the following: (a) to simulate various human-like anatomical actions for the purposes of demonstrating human physiology, anatomy, aesthetics, human-factors, and/or psychology, (b) to simulate natural interactive dialogue for the purpose of demonstrating principles of psychology, neuroscience, cognitive science, sociology, human relations, and/or other sciences and/or disciplines, (c) to introduce, describe, and guide the user academically through the reference or educational exercise, (d) to transition the trainee or student into the educational scenario, by natural dialogue interaction, (e) to act out a role in a theatrical manner appropriate to the educational or reference scenario, such as, for example, an HER acting as an aphasic patient may pretend to not recognize certain words or thoughts in a dialogue, in order to demonstrate the condition of partial aphasia, (f) to perceive and respond to the action of the user in a theatrical manner that enhances the reference education, (g) to quiz the user, or to provide feedback on user performance during educational exercises, (h) to perform any other services that may be automated that are currently performed by humans or machines acting in listed roles.

Embodiments of an HER may be used as a dummy for training and simulation, which may include without limit to: animated CPR training dummies, devices for surgical simulation, interactive simulation devices for police training, simulation devices for customer service training, sales training, and/or military training. In these cases, the HER may be used for one, some, all or none of the following: (a) to simulate various human-like movements for the purposes of making training exercises more realistic, (b) to engage the trainee with eye-to-eye contact, gestural interaction, and naturalistic dialogue in a manner pertinent to the topic of the training, in order to make the training more realistic, (c) to obtain data on the trainee by. verbal interaction, by visual sensing, by tactile sensing, by temperature sensing, by olfactory (chemical) sensing, and/or by accessing records, (d) to assess the trainee using expert systems database(s) and/or reasoning systems that may be based upon the standard training in field of use, (e) to customize the training or simulation in response to data obtained about the trainee, (f) to introduce, describe, and guide the trainee academically through the training, reference or educational exercise, (g) to transition the trainee into the educational scenario, by natural dialogue interaction, (h) to act out a role in a theatrical manner appropriate to the training scenario, such as, for example, an HER acting as a CPR dummy may pretend to choke severely in order to enhance the realism of the CPR training exercise, (i) to perceive and respond to the action of the trainee in a theatrical manner that enhances the training or education, (j) to provide the trainee feedback on performance during the training exercise, (k) to record and report assessments regarding a trainee's performance, (l) to perform any other services that may be automated that are currently performed by humans or machines acting in listed roles.

Embodiments of an HER may be used for testing and/or developing new computer software in general, and sociable Artificial Intelligence (AI) software in particular. In these cases, the HER may be used for one, some, all or none of the following: (a) to provide human-like facial expression, sensing, and communications to software, as means for the software to interact more naturally with humans (b) to allow software to obtain data from users by natural language dialogue, visual inspection, olfactory (chemical) sensing, and/or accessing records, so that the software may be more effective at interacting with humans, (c) to allow software to perceive and converse with a person so as to custom-adjust to the preferences of an individual human, (c) to provide software developers the ability to use natural communication techniques to give to software feedback on its performance, (d) to allow software to communicate its condition naturalistically to human software developers, (e) to serve as a nexus for integrating various software systems into a more capable whole system.

Embodiments of an HER may be used as a platform for testing and modeling scientific theories and hypotheses, which may or may not be used within the following fields: Neuroscience, Cognitive Science, Psychology, Sociology, Linguistics, Paralinguistics, Human Factors Engineering, and electroactive polymer (EAP) science. In these cases, the HER may be used for one, some, all or none of the following: (a) to provide means for representing theorized systems of human and animal communication, cognition, and society as means of empirically evaluating theories of such systems, (b) to provide a test platform for new materials and material science, for sensor science and technology, and for sciences of new and emerging actuators including electroactive polymer (EAP) actuators, (c) to serve as a platform for testing and developing control theory and control systems, (d) to provide a test platform for the science and technology of the mechanics of simulated human communications (e) to provide controlled communicative stimulus to living subjects to study the response of the subjects, (f) to assist with the design/engineering of systems and/or objects that need to be used by humans, by serving as a surrogate person when testing the system or object, (g) to assist with the design/engineering of systems and/or objects that emulate human communicative expression and/or cognition (such as, for example, HER systems themselves), (h) to automate the accumulation of data of human communications, cognition, and/or sociology for scientific assessment, by obtaining data from human test subjects via natural language dialogue, visual inspection, olfactory (chemical) sensing, tactile sensing, temperature sensing, and/or accessing records, (i) to assess collected data with software such as automated perception systems, statistical evaluation software, and/or artificial intelligence, (j) to use naturalistic dialogue to help communicate data and/or scientific evaluations to people.

Embodiments of an HER may be used to automate or to enhance policing and security activities. In these cases, the HER may also be used for one, some, all, or none of the following: (a) to simulate convincingly an officer or security guard, by making and maintaining eye contact with a person who enters the vicinity, and affectedly scrutinizing the person as if the person is suspicious, so as to cause a potential criminal to be reluctant to commit crime, (b) to interact in a friendly manner with people that are known and identified, (c) to obtain data by visual inspection, natural language dialogue, olfactory (chemical) sensing, temperature sensing, and/or accessing records, (d) to assess said data (including but not limited to nonverbal expression and language) with reasoning systems and/or expert systems database(s), to determine possible security threat, conflict and/or crisis situation, to automatically identify known criminals, or wanted and/or dangerous individuals (e) to employ an expert system and/or reasoning system to guide HER behavior, including interaction with humans in a crisis, (f) to interact with the public in a manner that is generally friendly and builds community trust, (g) to operate as a security or fire alarm, sounding an alarm upon a detected danger, and/or notifying outside agencies, such as police or fire departments or a security company, (h) to record audio, video, testimony, and.automated assessments of data, (i) to coordinate and communicate with a larger police or security network, (j) to communicate by naturalistic dialogue, data and assessment of security activities, to authorized personnel, (k) to perform any other services that may be automated that are currently performed by humans or machines acting in policing or security roles.

Embodiments of an HER may be used to provide a sociable interface for military machines, which may be advantageous by enabling faster communication from machine to human, such as is inherent to innate human-to-human communication, thereby expediting time-sensitive field operations. In these cases, the HER may be used for one, some, all, or none of the following: (a) to provide means for faster coordination of human and machine, particularly in battle situations, (b) to obtain data from a soldier, from the field, from civilians, and from enemy combatants and associated paraphernalia of war by visual inspection, olfactory (chemical) sensing, natural language dialogue, tactile sensing, temperature sensing, and/or accessing records, (c) to perform diagnosis and assessment of said data, by using expert systems database(s) and/or reasoning systems, (d) to deliver to a soldier by using naturalistic display and verbalizations, data, data assessments, and/or orders transmitted from commanding officers, (e) to naturalistically interact with civilians and possible enemy combatants, in order to disambiguate civilians from combatants, to obtain data, and to function as sentinels and as guards at checkpoints, (f) to disseminate to civilians and combatants propaganda and information, (g) to interact with injured soldiers as a medic, obtaining data for diagnosis by naturalistic dialogue, and to deliver the comforting sensation of the emulated presence of a caring human being, (h) to perform any other services that may be automated that are currently performed by humans or machines acting in military roles.

Embodiments of an HER may be used as a rescue robot enhancement, which may be advantageous by improving interaction with found survivors and may deliver to a survivor the comforting sensation of the emulated presence of another human being. In these cases, the HER may be used for one, some, all, or none of the following: (a) to provide nurturing attention to the survivor, and the soothing impression of the presence of a person, (b) to obtain data from the person by natural language dialogue, visual inspection, olfactory (chemical) sensing, tactile sensing, temperature sensing, and/or accessing patient records, (c) to perform diagnosis and assessment of said data, by using expert systems database(s)

and reasoning systems that may or may not be based upon the standardized accumulated knowledge of medicine, (d) to use naturalistic display and verbalizations to deliver messages to the survivor, and/or to therapeutically influence the survivor, (e) to record and relay assessments of a survivor's condition, interaction, and/or progress (f) to communicate to a medical care worker or professional, by naturalistic dialogue or other means, assessments regarding a survivor's condition and/or progress, (g) to perform any other services that may be automated that are currently performed by humans or machines acting in the roles of medic or paramedic.

While the above description has provided various options for implementing an HER and various applications of an HER, the described HER may omit some or all of the described mechanical, electronic, electromechanical, software, and other systems without departing from the scope of the invention. Other systems could be substituted for those disclosed. While certain materials have been described, other materials could be used without departing from the scope of the invention. While various applications of an HER have been described, the HER could be used for other applications without departing from the scope of the invention. While an HER could have a capability to perform all of the applications described herein, it might also perform none, some, or other functions without departing from the scope of the invention. While certain materials are described herein as desirable, other materials may be used without departing from the scope of the invention. It will further be understood by those skilled in the art that descriptions of mechanical systems above may include electronic, electromechanical, and biological components. Such systems may involve computer software as well.

Figure 13:
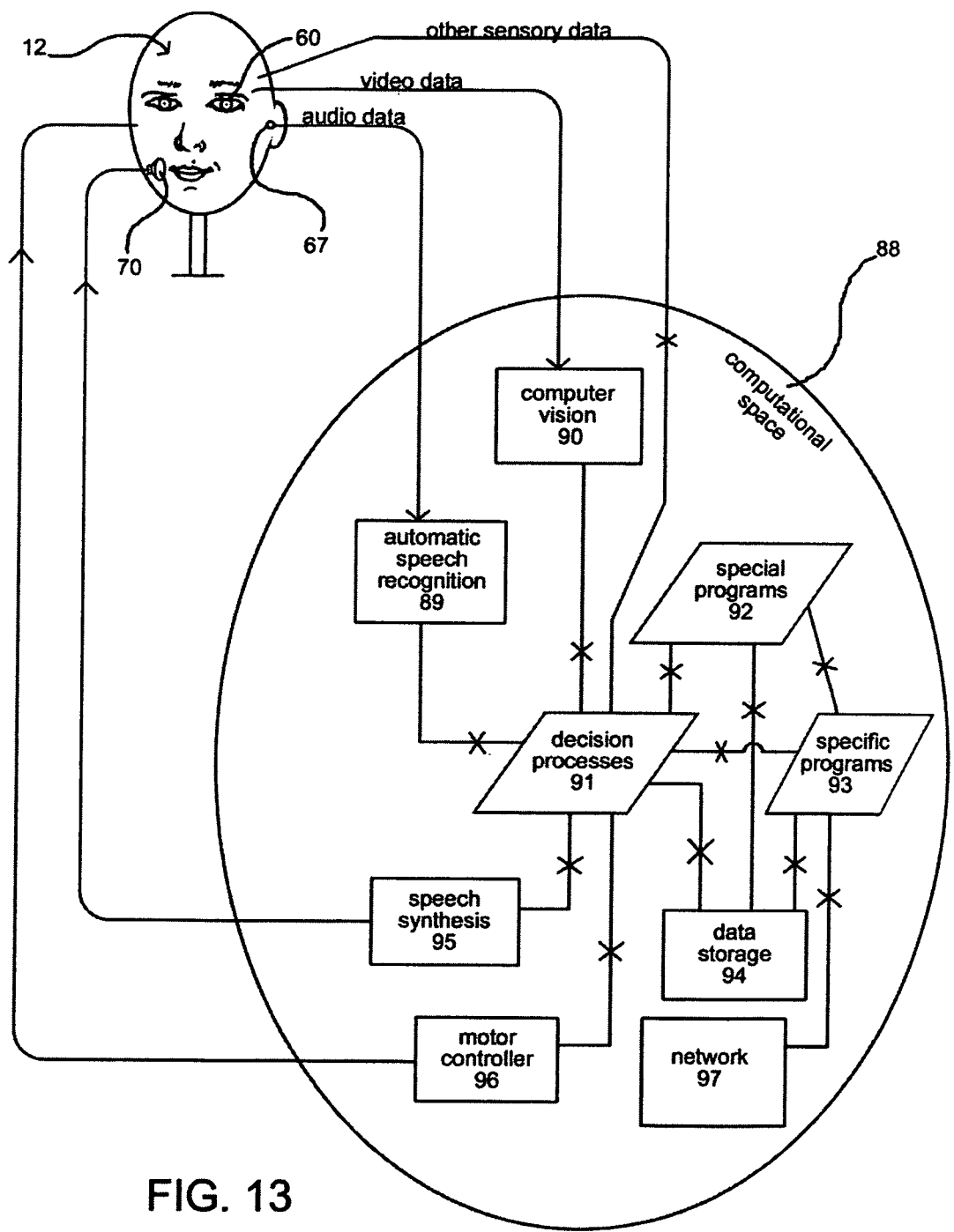
FIG. 13 is a block diagram illustrating one embodiment of a control system configuration that may be used to emulate the cognitive aspects of human communication in an HER.

FIG. 1 illustrates one embodiment of a Human Emulation Robot system, including an HED 12, and an electronic control system 13 that governs the operation of various mechanisms in order to emulate at least some verbal and nonverbal human communications. HED may include video sensors 60, audio sensors 67, skin 25, anchors 34, linkages 35, and an audio transducer 70. Data may be sent from the HED sensors to a computer by any suitable communications medium, including without limitation a wireless link, while control signals for speech and motor control may be brought into the embodiment by any suitable communications medium, including without limitation a wireless link. The same or separate communication link(s) could be used for both inputs and outputs and multiple communication links could be used without departing from the scope of the invention. Expressive functions of the face may be achieved using anchors 34, linkages 35 and actuators 33, organized to emulate at least some natural muscle effect. Sensor data may be relayed into a computational system 88, which in the figure comprises a computer and various software, but could exist within microcontroller(s), a computer network, or any other computational hardware and/or software. The functions performed by computational system 88 could also be performed in whole or in part by special purpose hardware. Although the computational system 88 is portrayed in FIG. 1 as existing externally to the HED, alternatively the computational system 88 may be partially or entirely enclosed within the HED without departing from the scope of the invention. Automatic Speech Recognition (ASR) 89, may process audio data to detect speech and extracts words and low-level linguistic meaning. Computer Vision 90 may perform any of various visual perception tasks using the video data, such as, for example, the detection of human emotion. Decision processes 91 may determine appropriate communicative responses and other behaviors based upon the input received. Special Programs 92 may be used to enhance the functionality of the system. Specific Programs 93 is other software that is accessed by the HER. Data storage 94 affects long term memory, builds knowledge, and stores software. Speech responses may be produced by any suitable speech synthesis software 95 and made audible using an audio transducer 70. Any suitable motor controller 96 may be used to control actuators to effectuate non-verbal expressions in the HED 12. Some or all of the components of computational system 88 could be omitted or other components added without departing from the scope of the invention. With respect to the software modules, FIG. 13 shows more specifically what each is doing, and describes commercially available, off-the-shelf options for each. While in the described embodiments, sensors are described as being placed within the HER emulated human face, HER devices do not require any of the sensing elements (which may include, without limit to, video cameras, microphones, olfactory sensors, touch sensors, velocity sensors, accelerometers, and/or positioning sensors) to be integral to the HED. Any and/or all sensors may be placed in other locations external to the HED (or in other locations within the HED than are described herein) without changing the scope of the invention. Additionally, other sensors may or may not be utilized as desired, such as, for example, bar-code scanners, infrared sensors, ultra-sound sensors, echo-location sensors, touch sensors, velocity sensors, accelerometers, positioning sensors, fingerprint scanners, retinal scanners, sphygmomanometers, pulse detectors, EEG detectors, terahertz imaging devices, magnetic resonance imaging devices, ground penetrating radar, skin current detectors, and/or any suitable other sensing, perception, or data-gathering and analysis instrumentation and technologies. An HER may or may not also access data from external sensors, potentially including sensors contained within other devices (such as, for example, weather stations, automobile sensors, "smart dust" sensors, other robots, and/or other HER devices), via any suitable means of data transmission, such as, for example, a computational network.

Figure 2:
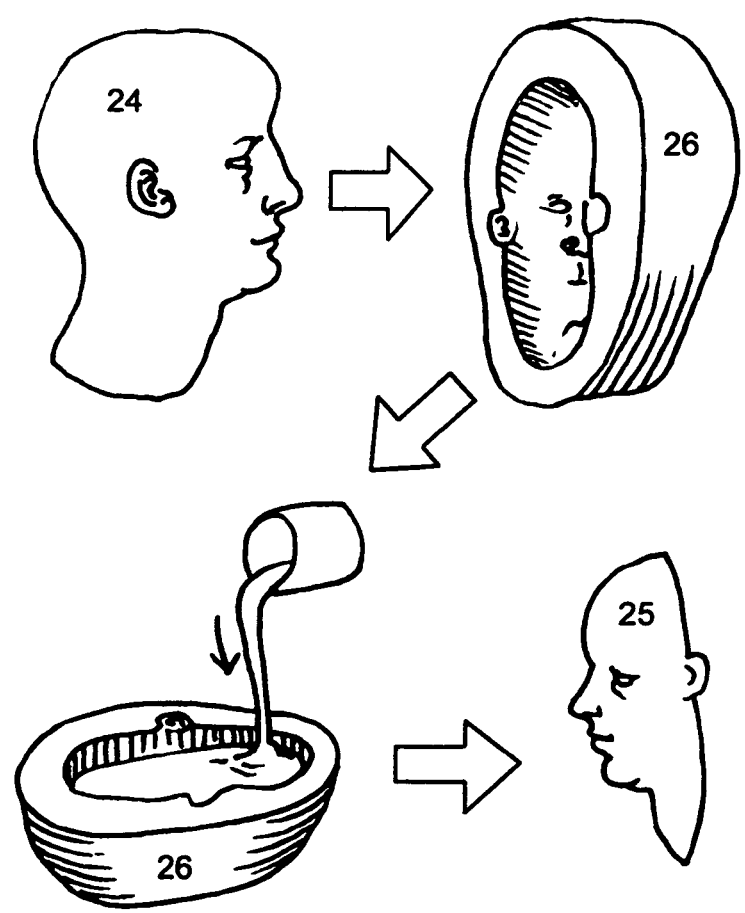
FIG. 2 illustrates one process by which an artificial skin may be produced.

FIG. 2 illustrates one process by which an artificial skin 25 may be produced. In the first step of the process, a human-like face form 24 is obtained by any suitable means that may or may not include sculpting, life-cast, or computer modeling and may be produced using Computer Numerical Control (CNC) milling. To then transfer said face-form into a substantially supple elastomer skin, one may make a mold 26 (negative impression) of said face-form. Such a mold may be made using a variety of known materials and a variety of known methods. Into this mold, any suitable elastomer may be poured, preferably while still liquid and catalyzing, and then said elastomer may be allowed to cure so that said elastomer adopts the form of said human-like face-form. Any suitable elastomer may be used for the skin, such as Thermoplastic, Silicone, Polyvinyl, Polyethylene, Polyurethane, Polyolefin, or the elastomers described herein as "Skin Rubber" and "Skin Rubber 2". If desired, the interior of the skin may be made hollow by any suitable process such as, for example, the process shown in FIG. 4. Additionally, if desired, hollow sockets may be made in the skin to accommodate artificial eyes, by affixing eyeball-shapes within the mold 26 before casting the skin, so that the eyeball-shapes impress hollow sockets into the skin.

Figure 3:
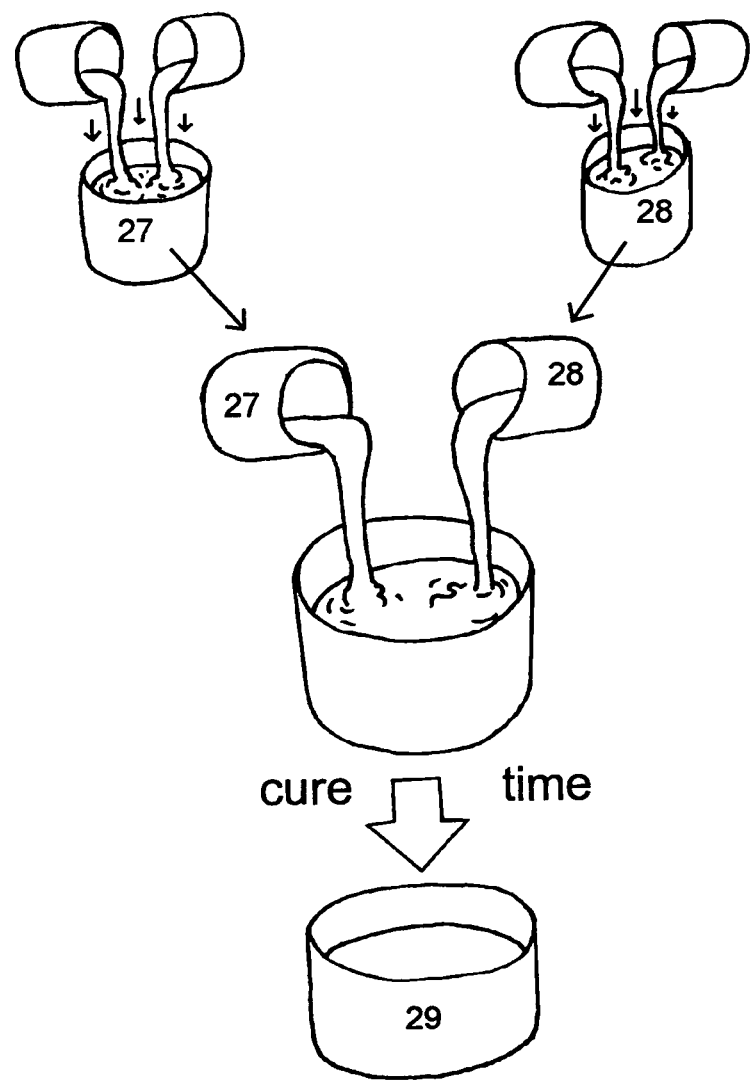
FIG. 3 illustrates a process by which artificial skin may be produced.

FIG. 3 illustrates a process by which Skin Rubber may be produced. Skin Rubber may be made from a freshly catalyzed Poly(urethane-urea) elastomer 27 (any suitable mixture of a diol and a diisocyanate, that cures into a high-molecular weight oligomer, might be used, such as, for example "Evergreen 10"—a product sold by the Smooth-On company) that is introduced by mixing (while said elastomer is still liquid and not yet fully cured) into a freshly catalyzed Poly(urethane-urea) foaming elastomer 28 (any suitable Polyurethane foam rubber may work, such as, for example "Flex-foam-it"—a product also sold by the Smooth-On company) that is also still liquid and curing. The resulting material cures to become Skin Rubber 29. A ratio of between 15% foam to 85% elastomer and 50% foam to 50% elastomer may be used.

Figure 4:
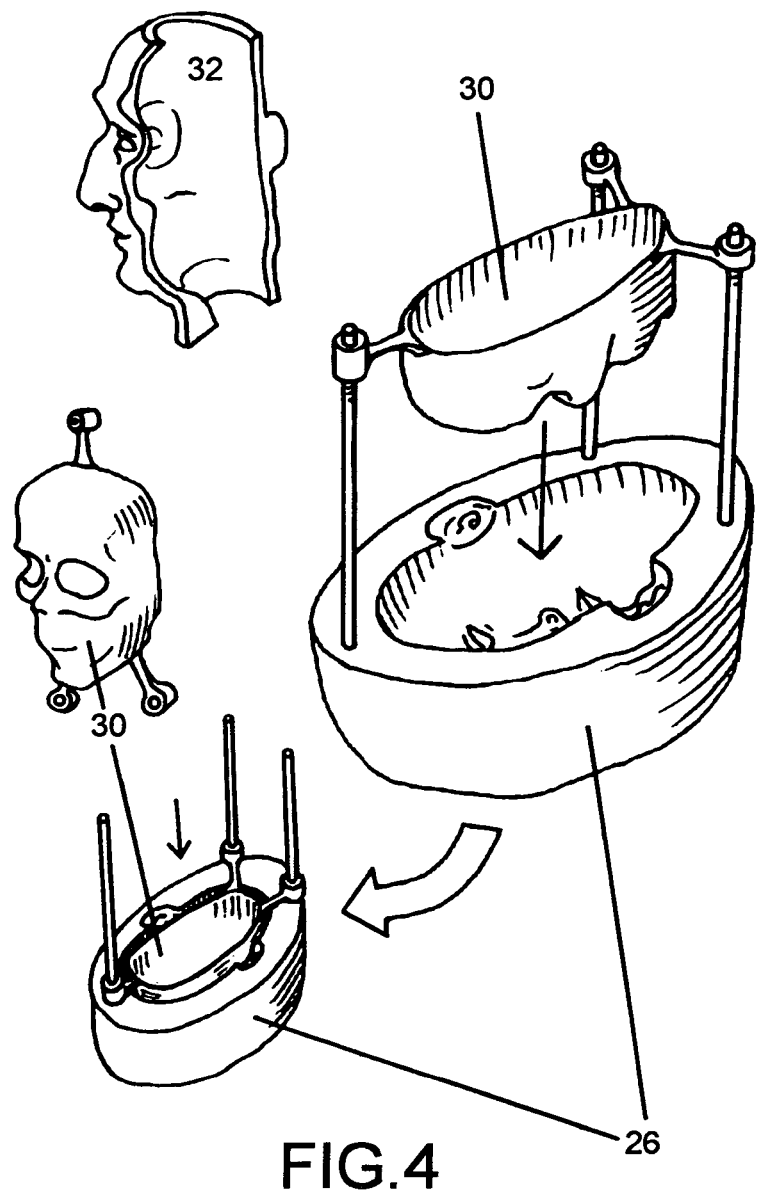
FIG. 4 illustrates one process by which one may cause the skin to have controlled thickness throughout its form.

FIG. 4 illustrates one process by which one may cause the skin to have controlled thickness where desirable or throughout its form, so that the skin may be made to deform into expressions in a naturalistic manner. In this process, the inner structure of the skin may be formed using an inner mold 30 that registers within the outer mold 26, such that the skin is then cast between the two. The interior structure of the resulting skin 32 may also correspond to the structure of a rigid mechanical frame, so that the skin may fit nicely onto a supporting mechanical frame.

Figure 12:
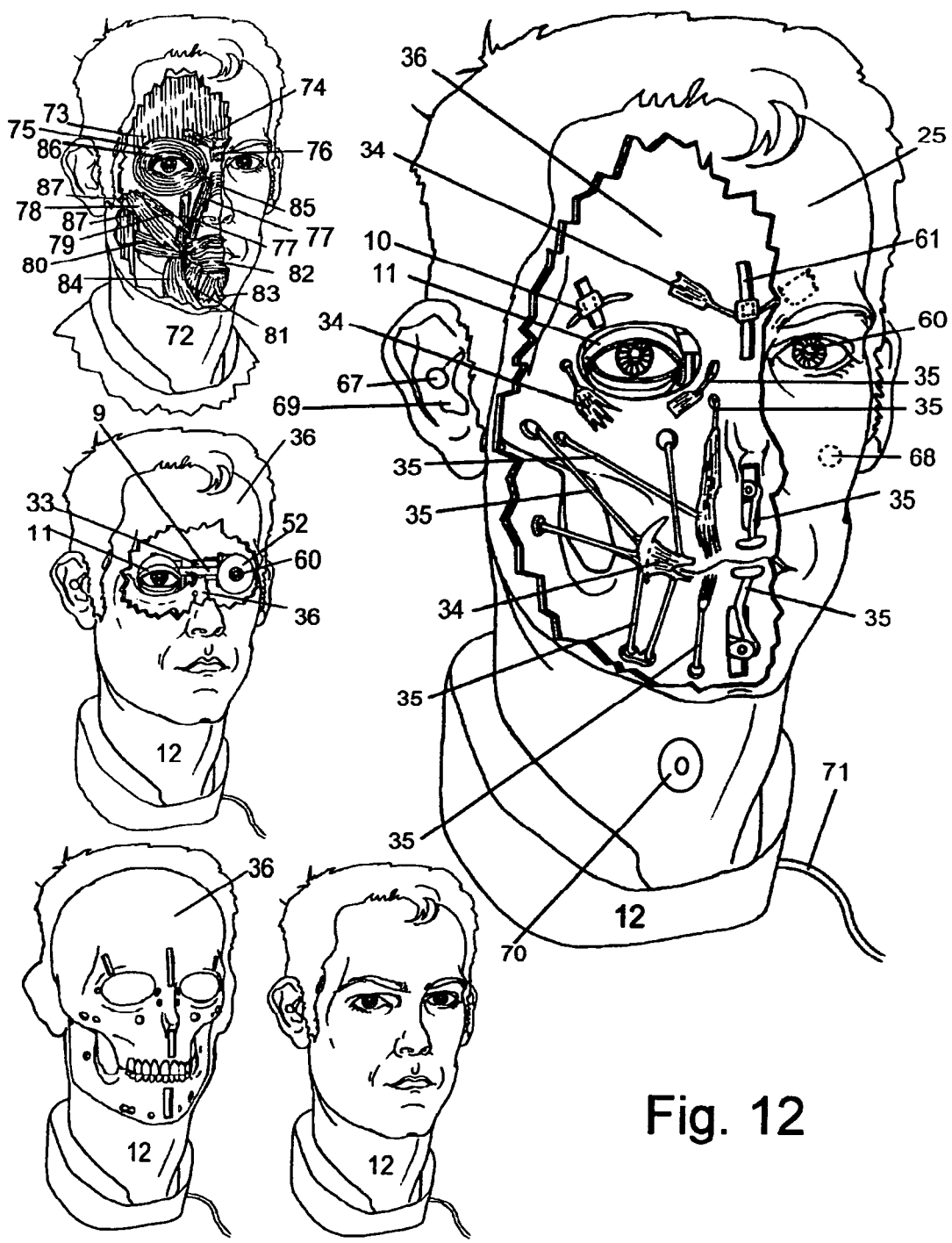
FIG. 12 illustrates one embodiment combination of skin, anchors, linkage, actuators, mechanical frame, eye mechanism, eyelids, and assorted sensors, so as to emulate communicative functions of the human face as a whole.

FIG. 5 illustrates one embodiment of an expression affector, a method by which expressive movement may be affected in a skin 25 by an actuator 33 pushing or pulling on an anchor 34 that is embedded within the skin 25. The anchor 34 and actuator 33 may be interconnected by linkage 35. In this embodiment, actuator 33 and the skin 25 are both mounted on a substantially rigid mechanical frame 36. Actuator 33 may be connected to mechanical frame 36 by a mounting bracket 37. As actuator 33 pushes or pulls the linkage 35, force is transmitted to the anchor 34, which then distributes the force through a region of the skin 25. The linkage 35 may pass through a Gap 38 in the mechanical frame 36, so that the actuator can be mounted on the interior of the mechanical frame 36. The mechanical frame may be used to serve multiple simultaneous functions, which may improve the economy of space and weight by supporting multiple structures simultaneously, wherein said structures may or may not include, without being limited to: facial expression actuators 33, supporting brackets 37, and/or artificial skin 25. In the illustrated embodiment, the various described elements may operate together to produce a smile, simulating the action of the Zygomaticus Major muscle. However, this mechanism may also be used in other parts of the face to emulate the actions of other facial muscles, as is depicted in FIG. 12. It may also be used to emulate the appearance of actions of muscles in the body. Actuator 33 comprises a servomotor, but may be replaced by any suitable actuator (such as, for example, shape memory alloy or electroactive polymer actuators).

While actuator 33 in this embodiment both pushes and pulls linkage 35, actuators could be used where suitable for either pushing or pulling standing alone. Moreover, a different actuator could be used for pushing than for pulling linkage 35. The illustrated actuators, linkages, and anchors are only examples, and other ways of moving skin 25 could be used without departing from the scope of the invention.

Figure 6:
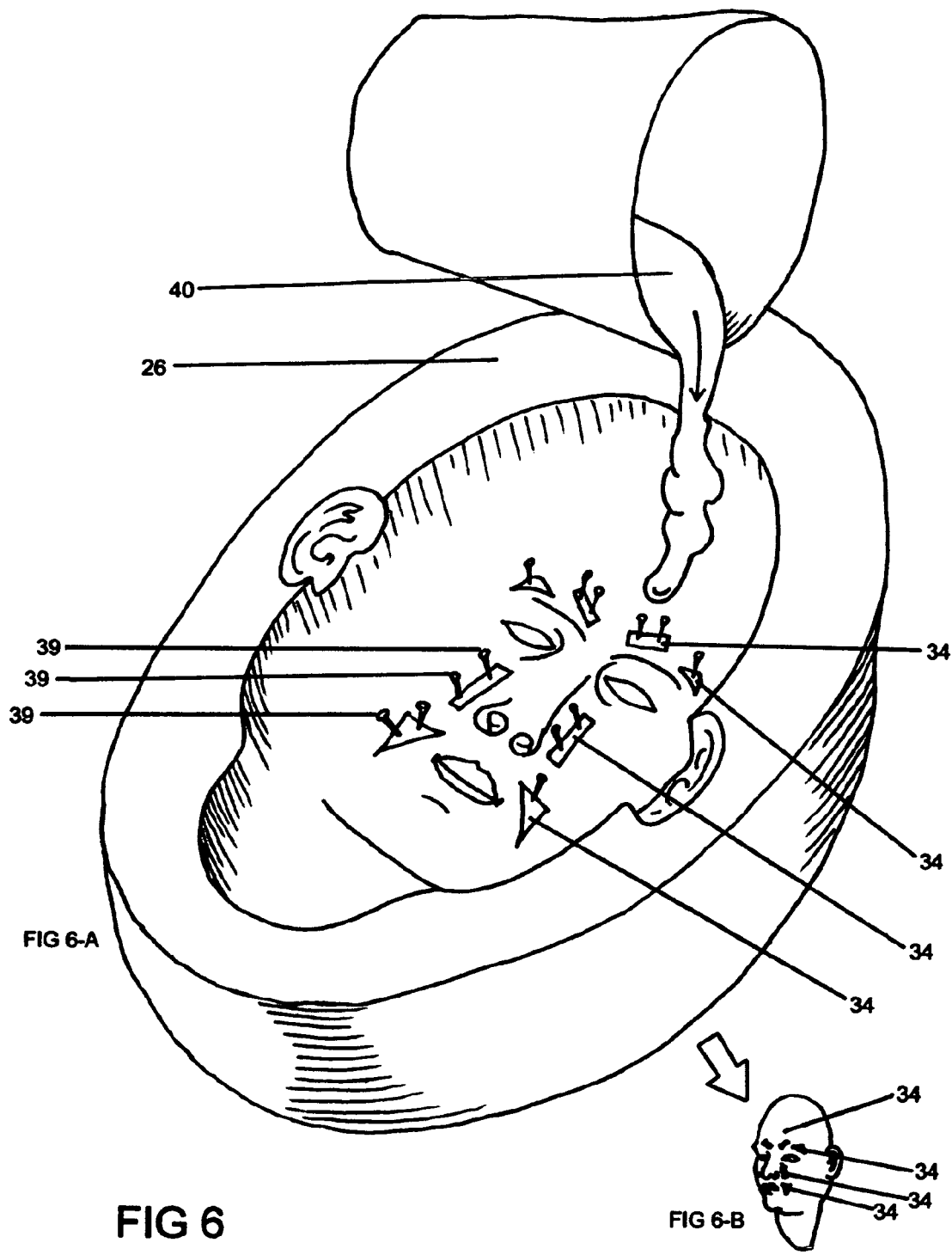
FIG. 6 illustrates one method by which anchors may be embedded into the skin by affixing them with pins into the mold of the face-form prior to casting the skin.

FIG. 6 illustrates one method by which anchors 34 may be embedded into the skin 25 by affixing them with pins 39 into the mold 26 of the face-form prior to casting the skin. When the liquid elastomer 40 of the skin is poured over the anchors 34, the anchors 34 become secured within the skin as the elastomer cures into a skin 25. FIG. 6b shows the resulting skin 25 with embedded anchors 34. Other forms of coupling an actuator (directly or indirectly) to the skin 25 to achieve movement thereof could be used without departing from the scope of the invention.

Figure 7:
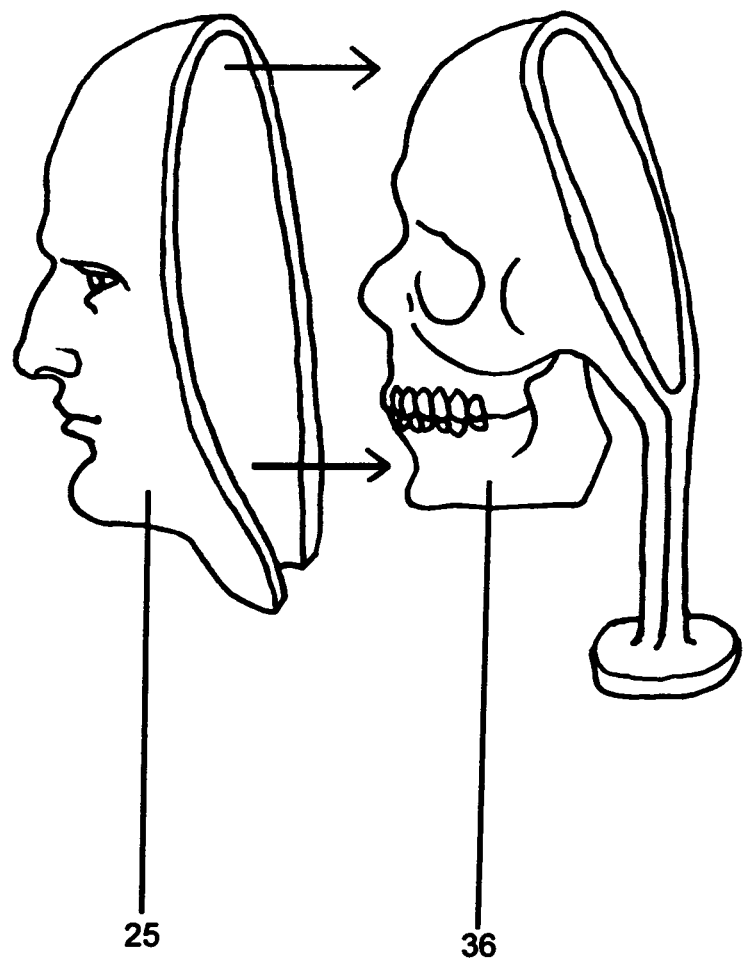
FIG. 7 illustrates one embodiment of a mechanical frame, a system that may mechanically support skin.

FIG. 7 illustrates one embodiment of a mechanical frame 36 that may mechanically support the skin 25. This mechanical frame 36 may be skull-like in form to enable the artificial-skin 25 to ride over the frame into expressions that, in at least some cases, closely resemble those of the natural human face. Skin 25 may be attached to mechanical frame 36 by any suitable means.

Figure 8:
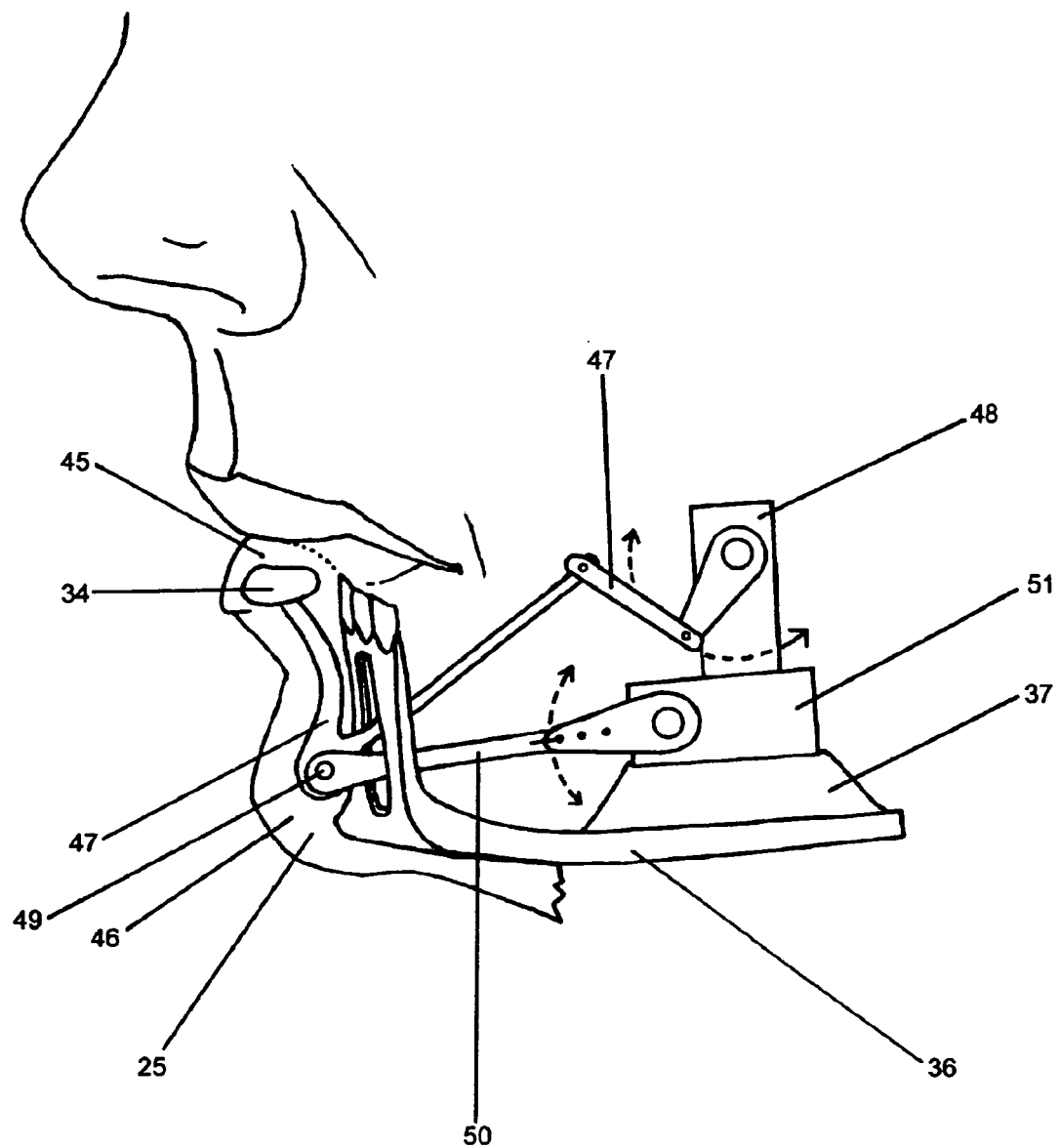
FIG. 8 illustrates one embodiment of a system that may be used to affect naturalistic motion in an artificial lip.

FIG. 8 illustrates one embodiment of a system (lip mechanism) that may be used to affect naturalistic motion in an artificial lip 45. An elastomeric artificial skin 25 is cast into a form that approximates a lower lip 45 and a chin 46. A substantially flexible anchor 34, such as, for example, one made of rubber or cloth, may be embedded within the skin of the lower-lip 45 to distribute force through the skin 25, to prevent the skin from tearing and to improve aesthetic performance. A substantially rigid or semi-rigid linkage 47, composed of any suitable substance, may connects said anchor 34 to an actuator 48 in order to affect motion. This linkage 47 may extend vertically down from the lip into the chin 46, whereat the linkage may bend to enter the interior of the face to be actuated. At this bend, a rotating joint 49 may fasten said linkage to second substantially rigid linkage 50, which is embedded in the artificial skin of the chin 46. Said second linkage 50 may also extend into the interior of the face to be moved by actuator 51, such that it affects an up-down motion within the artificial skin of the chin 46. Because the linkages (47 and 50) are fastened together in this embodiment, the first linkage 47 is responsive to the motion of the second linkage 50 to transmit this up-down motion upwards into the lower lip 45. First linkage 47, rotating as a lever about the joint 49 where it meets said second linkage 50, also then affects an additional in-and-out motion to the lower lip when moved by another actuator 48. All actuators may be substantially rigidly connected to a mechanical frame 36, by a mounting bracket 37.

Figure 9:
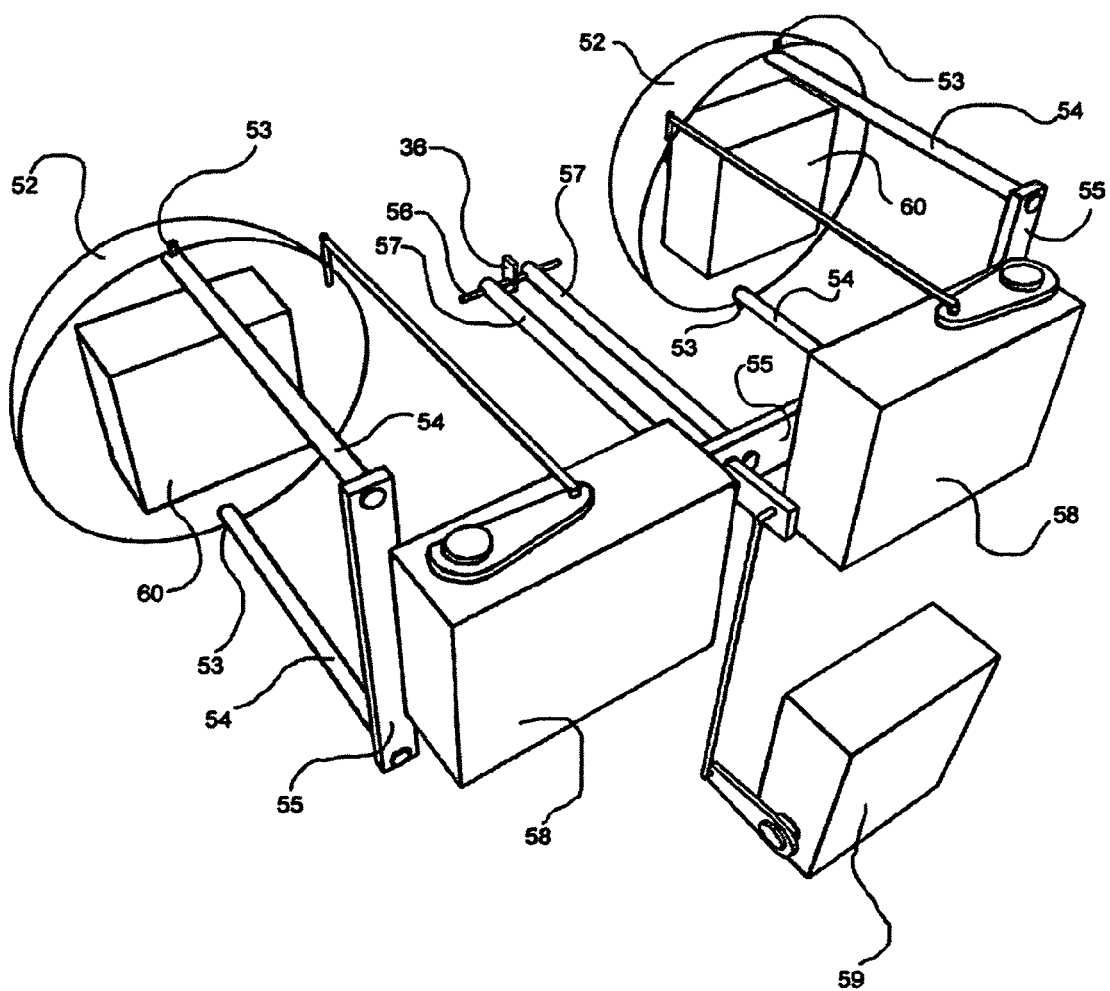
FIG. 9 illustrates one embodiment of an eye mechanism, a system that may be used to affect natural-appearing motion in artificial eyes.

FIG. 9 illustrates one embodiment of an eye mechanism that may be used to affect at least some natural-appearing motion in artificial eyes. Artificial-eyes 52 pivot on points 53 located upon the vertical axes of said eyes. Substantially rigid struts 54 connect said points to a substantially rigid frame 55 (hereafter called "eye frame"), such that said struts and said frame together keep the said vertical axes (at least approximately) in parallel. A hinge 56 may connect said frame to a larger mechanical frame 36, such that the hinge 56 pivots about a horizontal axis that intersects the (at least approximate) center of both said artificial-eyes 52. Substantially rigid strut or struts 57 reach from said hinge 56 to connect to the eye frame 55, with geometric proportions such that each of said vertical axes intersect said horizontal axis at the (at least approximate) center of each artificial eye. This geometry promotes proper ball-like rotational behavior of said eyes relative to mechanical frame 36. Two actuators 58 may then affect the rotation of the artificial-eyes 52 about their vertical axes; and one more actuator 59 may affect the rotation of the entire eye mechanism around said horizontal axis of the hinge 56. To endow a Human Emulation Robot with vision, one may embed video sensors 60 within the artificial eyes 52.

Figure 10:
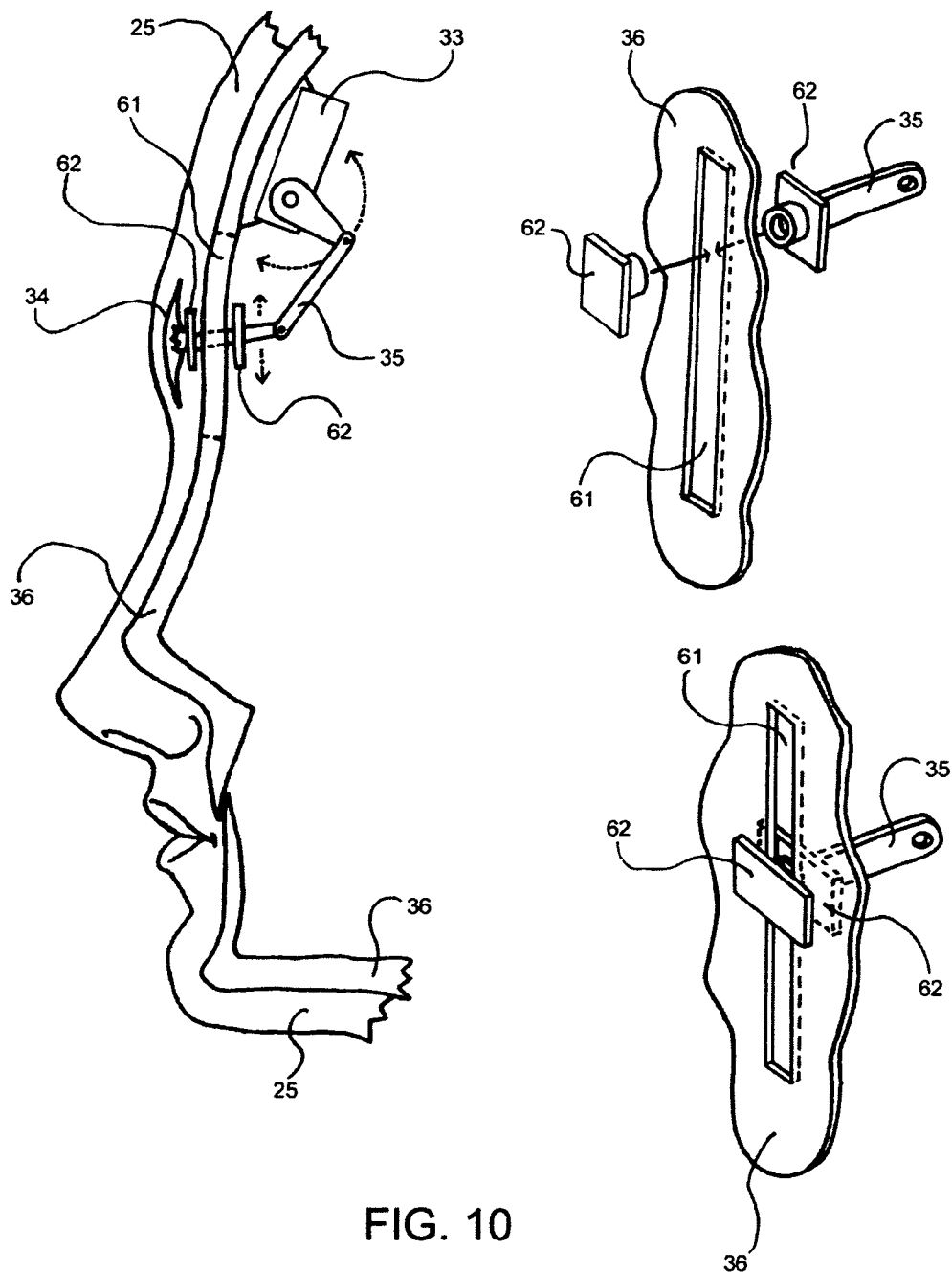
FIG. 10 illustrates one embodiment of a system that may be used to affect motion in an elastomeric skin of an artificial human or animal, by a linkage acting within a slot in the mechanical frame.

FIG. 10 illustrates one embodiment of a system, sliding affector, that may be used to affect motion in skin 25. This system comprises a substantially rigid linkage 35 that extends from an actuator 33 through a slot 61 in the body of a mechanical frame 36 to attach to an anchor 34 in the skin 25, such that the slot 61 guides and channels the motion of linkage 35 when the linkage is moved by actuator 33, thus controlling motion of the skin 25. Inside and outside the slot 61, the linkage 35 may be flanged, so that one or two flanges 62 may prevent the linkage 35 from slipping through the slot 61. Such a flanged linkage may be made in two separate pieces that are inserted into opposite sides of slot 61 during manufacturing, so that they adhere together, effectively locking the linkage 35 into the slot 61. Any number of pieces could be used, however, without departing from the scope of the invention. In the depicted embodiment, this system may be used to emulate the motion of the center portion of a human forehead, caused by the Frontalis muscle, which moves the central brow upward into the forehead, and/or by the human Procerus muscle, which pulls the forehead down into a scowl.

Figure 11:
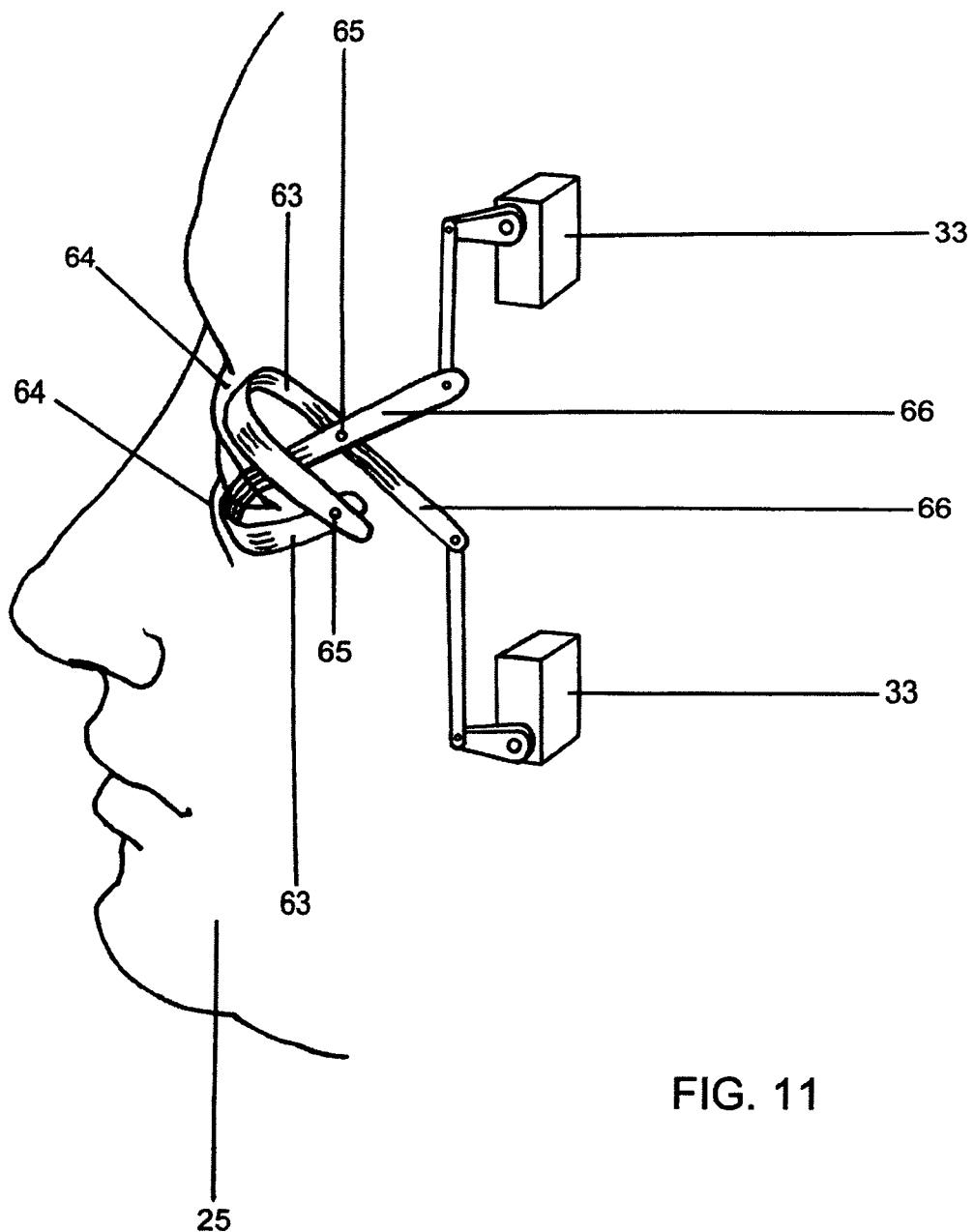
FIG. 11 illustrates one embodiment of a system that may be used to affect the appearance of the dynamic action of the human eyelids.

FIG. 11 illustrates one embodiment of an eyelid mechanism system that may be used to affect the appearance of the dynamic action of the human eyelids. Curved bands 63 of substantially rigid or semi-rigid material may be embedded in the part or parts of the skin 25 that resemble eyelids 64. Such bands may be used for the upper-lid, the lower lid, or both. If two bands are used in conjunction to comprise both upper and lower lids, then as the curved bands follow the forms of the lids the bands may cross, whereat the curved bands may be attached together as a joint 65 for stabilization. One or both of these joints 65 may be additionally attached to a mechanical frame 36 for additional stabilization. The portions of the curved bands 63 that then extend past the corners may continue into the interior space behind the eyes, such that they may operate as levers 66 to be pulled or pushed up or down by actuators 33, causing the lids 64 to correspondingly open or close. Optionally, the curved bands 63 may be embedded within the skin of the eyelids by gluing, or by placement in the skin mold prior to casting the skin, in like manner used to embed anchors in FIG. 6. Alternatively, any other suitable means may be used to move the eyelids of an HER, or said eyelids may not be moved independently at all, without departing from the scope of the invention.

FIG. 12 illustrates one embodiment of an HED, wherein skin 25, anchors 34, linkages 35, actuators 33, mechanical frame 36, eye mechanism 9, eyelid mechanism 11, and sensors 60, 67, 68, are configured so as to emulate communicative functions of the human face as a whole. Sensors distributed through the HED may include video sensors 60, embedded in the artificial eyes 52, audio sensors 67 in the artificial ears 69, and touch sensors 68 embedded in the artificial skin 25. Additionally, an audio transducer 70 may be present to project synthetic speech. In this embodiment, data may be sent to and from the HED by a cable 71. Alternatively, any of the communication link options discussed above could also be employed with this embodiment. Alternatively, all or partial computational apparatus used to achieve HER control processes may be contained within the HED without departing from the scope of the invention. Expressive visual-display functions of the face may be achieved by eye mechanism 9, eyelid mechanisms 11, and anchors 34, linkages 35 and actuators 33, which may be assembled into expression affectors 5 and/or sliding affectors 10. Alternatively, any other means may be used to emulate human expressive visual-display without departing from the scope of the invention. As in the illustrated embodiment, any or all of the major muscle groups present in the natural anatomy of the human face 72 may be represented and emulated. These major muscle groups may include Frontal is 73, Corrugator 74, Orbicularis oculi 75, Procerus 76, Levator labii superioris 77 (when emulated, the effect of this muscle may or may not be treated as interchangeable with that of Caninus), Zygomaticus major 78, Zygomaticus minor 79, Buccinator 80 (when emulated, the effect of this muscle may be treated as interchangeable with that of Risorius), Depressor labii 81, Orbicularis oris 82, Mentalis 83, Triangularis 84 (when emulated, the effect of this muscle may be treated as interchangeable with that of Depressor anguli oris), Nasalis 85, and Superior Tarsal Muscle 86 (which generally operates in conjunction with and similarly to the Levator palpebrae and the palpebral muscles of the Orbicularis oculi). Additionally, other muscles may or may not be emulated, such as, for example, those that achieve jaw movements—Jaw muscles 87, and/or those that achieve head and neck poses. Alternatively, the surface distortions of human facial skin may be emulated with other means that do mimic any aspects of the associated, underlying human muscular physiology and its actions; such other means may include some, all or none of the following: a polymer video display molded into the form of the human face, a dynamically distorting sheet of electroactive polymer material, video projected into a translucent shell molded into the approximate form of the human face, and/or motion affected in the underlying mechanical frame.

Following is discussion of how the listed muscle groups may be emulated by using techniques described in this patent. Detailed studies of the actions and geometries of the listed muscles and/or other expressive muscles are publicly available in the literature of medical anatomy, anthropology, psychology, and film animation. Such literature may be consulted regarding geometry for emulated muscle placements, vectors of emulated muscle motions, and for the paralinguistic, narrative, and/or aesthetic meaning of individual and orchestrated muscle actions when expressing simulated thoughts, reflexes, and emotions. Such placements, vectors, and paralinguistic decision-making, may also be customized to suit a particular embodiment, or to suit the desires of an engineer or artist. In general, the muscles of the face that are linear (which includes all except the Orbicularis oculi 75 and the Orbicularis oris 82 muscle groups) may be emulated using expression affectors 5 and/or sliding affectors 10. The multiple complex actions of the ring-shaped muscles groups of the face, which include Orbicularis oculi 75 and Orbicularis oris 82, may be emulated by combinations of expression affectors 5, sliding affectors 10, eyelid mechanisms 11, and/or lip mechanism 8. These multiple actions may act in concert to emulate the "pursing" action of the ring-shaped muscles. Alternatively, other means may be used to achieve this affect, such as, for example, a "drawstring" approach.

The details of the above mentioned muscular emulations are described below. Alternatively, any other suitable means may be used to reproduce the action of the listed muscle groups.

To emulate the action of the Frontalis 73 in the center of the forehead, a sliding affector 10 (or multiple sliding affectors) may be used, pulling the skin of the central forehead upward into positions characteristic of expressions that may include "surprise", "fear", "sorrow", "skepticism", "greetings", and "curiosity". One embodiment of the emulation is shown in FIG. 10, and is accordingly described in detail. Alternatively, any other suitable means may be used to reproduce the action of this muscle group.

To emulate the action of the Frontalis 73 on the outer regions of the forehead, a sliding affector 10 or an expression affector 5 may be used to pull the skin of the outer eyebrows upward into positions characteristic of expressions that may include "surprise", "mischief", "skepticism", and "curiosity". Alternatively, any other suitable means may be used to reproduce the action of this muscle group. To emulate this muscle action with an expression affector 5, an anchor 34 may be embedded within the outer portion of each eyebrow. A flexible linkage 35 attached to the anchor may run upward along the forehead, and then bend around (and run through) a radiused opening present in a mechanical frame 36. From here, the linkage 35 may extend back into the cavity interior of the mechanical frame 36, where it may attach to an actuator 33. When actuated, this linkage 35 slides around and through the radiused opening, pulling the anchor 34 and skin at an angle approximating that of the action of Frontalis 73 muscle, so as to cause the eyebrow to arch and the skin of the outer forehead to bunch up. Alternatively, a sliding affector 10 may be embedded in the outer portion of each eyebrow, such that its slot in the mechanical frame 36. extends upward under the skin of the forehead. As the sliding affector 10 rides upward in the slot, the eyebrow is made to arch, and the skin above may bunch up realistically. Alternatively, any other suitable means may be used to reproduce the action of this muscle group.

To emulate the action of the Corrugator 74 on the central regions of the forehead, expression affectors 5 may be used to pull the skin that is vertically above the central region of each eyebrow, inward and slightly down into a furrowed, bunched position that is characteristic of expressions that may include "anger", "concentration", "protective bunching", "skepticism", "sorrow", and "fear". Alternatively, any other suitable means may be used to reproduce the action of this muscle group. To emulate this muscle action using an expression affector 5, an anchor 34 may be embedded in the skin that lies vertically above each eyebrow. A flexible linkage 35 may attach to the end of the anchor 34 that is nearest to the center of the forehead, and the linkage 35 may run toward the center of the brow, angled slightly downward. Near the center of the brow, the linkage 35 may bend around (and run through) a radiused opening present in a mechanical frame 36, after which the linkage 35 may extend back into the cavity interior of the mechanical frame 36, where it may attach to an actuator 33. When actuated, this linkage 35 slides around and through the radiused opening, pulling the anchor 34 and skin inward at an angle approximating an angle of action of Corrugator 74 muscles, so as to cause the skin to bunch into a "furrow". Alternatively, a radiused opening may be present in the body of the aforementioned sliding linkage 35 that emulates the action of Frontalis 73 in the center of the forehead, so that the "scowl" may move upward with the motion of this linkage, so as to create enhanced realism in expressions that may include "fear" and "sorrow". Alternatively, any other suitable means may be used to reproduce the action of this muscle group.

To emulate the action of the Procerus 76 on the inner regions under the eyes and the center of the brow, a sliding affector 10 may be used to pull the skin that is between the eyes and in the central forehead downward into positions that are characteristic of expressions that may include "squinting", "anger", "protective bunching", "disgust", "concentration", and "skepticism". This Procerus-emulating sliding affector 10 may double as the one used to emulate the action of the Frontalis 73 in the center of the forehead, so that the sliding affector 10 emulates Frontalis 73 when sliding upward, but emulates the Procerus 76 when sliding down, as is demonstrated in FIG. 10. Alternatively, any other suitable means may be used to reproduce the action of this muscle group.

To emulate the part of the action of the Orbicularis oculi 75 that moves the eyelids, eyelid mechanisms 11 may be used. Alternatively, any other suitable means may be used to reproduce the action of this muscle group.

To emulate the action of the Orbicularis oculi 75 on the outer regions under the eyes, expression affectors 5 may be used to pull the skin that is under the eyes and in the cheeks upward and outward into bunched positions that are characteristic of expressions that may include "squinting", "Duchenne (true) smile", "fear", "protective bunching", "disgust", "curiosity", and "skepticism". Alternatively, any other suitable means may be used to reproduce the action of this muscle group. To emulate this muscle action using expression affectors 5, anchors 34 may be embedded in the lower eyelids, near the eyes, and may extend down into the cheeks. A linkage 35 may run upwards from the anchor 34, along the outside of the eye, then to bend around (and run through) a radiused opening present in a mechanical frame 36. After this, the linkage 35 may extend back into the cavity interior of the mechanical frame 36, where it may attach to an actuator 33 that may be mounted to the mechanical frame 36. Then, when actuated, this linkage 35 slides around and through the radiused opening, to pull the anchor 34 and skin 25 so that the skin slides upward and bunches around the corner of the eye.

To emulate the action of the Orbicularis oculi 75 on the inner regions under the eyes, running toward the nose, expression affectors 5 may be used to pull the skin that is under the eyes and in the cheeks upward and inward into bunched positions that are characteristic of expressions that may include "squinting", "Duchenne (true) smile", "protective bunching", "disgust", "curiosity", and "skepticism". Alternatively, any other suitable means may be used to reproduce the action of this muscle group. To emulate this muscle action using expression affectors 5, anchors 34 may be embedded in the lower eyelids, near the eyes, and may extend down into the cheeks. A flexible linkage 35 may run from an anchor 34 toward the nose, angling slightly upward, and then bend around (and run through) a radiused opening present in a mechanical frame 36. From there, the linkage 35 may extend back into the cavity interior of the mechanical frame 36, where it may attach to an actuator 33 mounted to the mechanical frame 36. When actuated, the linkage 35 may be made to slide around and through the radiused opening, pulling the anchor 34 and skin in and up so as to bunch into a "squint".

To emulate the action of the Orbicularis oculi 75 on the portions of the eyebrows and the skin above the eyes that extend from the approximate center of the eyes to the outside edge of the face, sliding affectors 10 may be used to pull the skin and outer eyebrows down and inward into bunched positions that are characteristic of expressions that may include "squinting", "concentration", "protective bunching", "sorrow", "curiosity", and "skepticism". Alternatively, any other suitable means may be used to reproduce the action of this muscle group. A sliding affector 10 used for this affect may also double as the one used to emulate the action of the outer regions of Frontalis 73 when raising the eyebrow, so that the sliding affector 10 emulates Orbicularis oculi 75 when sliding down, but emulates the Frontalis 73 when sliding up.

The muscles of the eyeballs may be emulated using the eye mechanism. Alternatively, any other suitable means may be used to reproduce the action of these muscles.

To emulate the action of Levator labii superioris and/or Caninus 77, which vertically pulls the outer regions of the upper lip, expression affectors 5 may be used to form the skin into positions that are characteristic of expressions such as: some forms of smiles, "fear", and some speech-related movements. Alternatively, any other suitable means may be used to reproduce the action of this muscle group. To emulate this muscle action by using expression affector 5, anchors 34 may be embedded along the sides of the mouth; these may double as the anchors used for other emulated muscles, such as, for example, Zygomaticus major 78. A flexible linkage 35 may run from the top of the anchor 34 upward parallel to the nose, to bend around (and run through) a radiused opening present in a mechanical frame 36, below the eye. From there, the linkage 35 may extend back into the cavity interior of the mechanical frame 36, where it may attach to an actuator 33 mounted to the mechanical frame 36. When actuated, the linkage 35 may be made to slide through the radiused opening, pulling the anchor and skin upward so as to bunch into a "smirk".

To emulate the action of Zygomaticus major 78, which pulls the corners of the lips and regions nearby on the cheeks, expression affectors 5 may be used to pull the skin out and upward into positions that are characteristic of expressions that may include "joy", "fear", "protective bunching", "grief", and some speech-related movements. Alternatively, any other suitable means may be used to reproduce the action of this muscle group. To emulate this muscle action by using expression affector 5, an anchor 34 may be embedded along the corner of the mouth, and may extend out into the cheek. This anchor may double as that used by other emulated muscle groups (such as, for example, Depressor labii 81), The anchor 34 may be composed in part of cloth, and may extend some distance into the lips to reinforce the lips and the corner of the mouth to prevent tearing. This anchor 34 may be also partly composed of a semi-rigid crescent of any suitable material placed along the crease of the side of the smile, to cause the skin to fold along this crease in a realistic manner. The anchor 34 may also be partly composed of a cloth appendage that will produce a "dimple" in the cheek when pulled, for enhanced aesthetics and realism. A flexible linkage 35 may run from the cheek-side part of the anchor upward and outward, following the cheek, to reach a point on a mechanical frame 36 that is near the outer edge of the face, below the level of the eyes (geometrically, this point may correspond with the location that the Zygomaticus major 78 muscle attaches to the zygomatic arch in humans). At this point, the linkage 35 bends around and runs through a radiused opening present in the mechanical frame 36. From there, the linkage 35 may extend back into the cavity interior of the mechanical frame 36, where it may attach to an actuator 33 mounted to the mechanical frame 36. When actuated, the linkage 35 may be made to slide through the radiused opening, pulling the anchor and skin upward so as to bunch into a "smile".

To emulate the action of Zygomaticus minor 79, which elevates the upper lip and regions along the sides of the nose (particularly in expressions of contempt), expression affectors 5 may be used to form the skin into positions that are characteristic of "sneer", "disgust", "anger", "fear", some forms of smiles, and some speech-related movements. Alternatively, any other suitable means may be used to reproduce the action of this muscle group. To emulate this muscle action by using expression affectors 5, anchors 34 may be embedded in the top of the upper lip, approximately one fourth of the way in from the corners of the mouth. A flexible linkage 35 may run from the top of each anchor 34 upward and outward, into the cheek, to reach a part of a mechanical frame 36 toward the outer edge of the face, just below the level of the eyes. At this point, the linkage 35 bends around and runs through a radiused opening present in the mechanical frame 36. From there, the linkage 35 may extend back into the cavity interior of the mechanical frame 36, where it may attach to an actuator 33 mounted to the mechanical frame 36. When actuated, the linkage 35 may be made to slide through the radiused opening, pulling the anchor 34 and skin upward so as to bunch into a "sneer".

To emulate the action of Buccinator 80, which pulls the corners of the lips and regions nearby on the cheeks outward, expression affectors 5 may be used to pull the skin out into positions that are characteristic of expressions that may include "joy", "fear", "protective bunching", "grief", and some speech-related movements. Alternatively, any other suitable means may be used to reproduce the action of this muscle group. To emulate this muscle action by using expression affector 5, an anchor 34 may be embedded along the corner of the mouth, and may extend out into the cheek. The anchor 34, which may double as that used by other emulated muscle groups (such as, for example, Zygomaticus major 78), may be composed in part of cloth, and may extend some distance into the lips to reinforce the lips and the corner of the mouth, to prevent tearing. This anchor 34 may be also partly composed of a semi-rigid crescent of any suitable material placed along the crease of the smile, to cause the skin to fold along this crease in a realistic manner. The anchor 34 may also be partly composed of cloth appendage that will produce a "dimple" in the cheek when pulled, for enhanced aesthetic and realism. A flexible linkage 35 may run from the cheek-side part of the anchor 34 horizontally outward, following the cheek, to reach a part of a mechanical frame 36 near or at the outer edge of the face. At this point, the linkage 35 bends around and runs through a radiused opening present in the mechanical frame 36. From there, the linkage 35 may extend back into the cavity interior of the mechanical frame 36, where it may attach to an actuator 33 mounted to the mechanical frame 36. When actuated, the linkage 35 may be made to slide through the radiused opening, pulling the anchor 34 and skin outward so as to affect an expression like that associated with the long "E" utterance.

To emulate the action of Depressor labii 81, which pulls portions of the lower lip downward, expression affectors 5 may be used to pull the skin out into positions that are characteristic of expressions that may include "fear", "critical thinking", "grief", and some speech-related movements. Alternatively, any other suitable means may be used to reproduce the action of this muscle group, such as, for example, lip mechanism 8. To emulate this muscle action by using expression affector 5, an anchor 34 may be embedded in the lower lip, approximately one fourth of the way in from the corners of the mouth. A flexible linkage 35 may run downward from the lower part of the anchor 34, to reach a part of a mechanical frame 36 at or near the jawline. At this point, the linkage 35 may bend around and run through a radiused opening present in the mechanical frame 36. From there, the linkage 35 may extend back into the cavity interior of the mechanical frame 36, where it may attach to an actuator 33 mounted to the mechanical frame 36. When actuated, the linkage 35 may be made to slide through the radiused opening, to pull the anchor 34 and skin downward so as to affect an expression like a frown.

Lip mechanism 8 may be used to emulate orbicularis oris 82 in its action to raise, lower and/or push out parts of the lips, actions that are characteristic of expressions that may include "fear", "joy", "disgust", "sorrow", and speech-related movements. Alternatively, any other suitable means may be used to reproduce these actions of this muscle group, such as, for example, expression affector 5. Optionally, to increase the expressivity of the upper lip, multiple lip mechanisms 8 may impart motion to different discrete sections along the length of the upper lip. Lip mechanisms, in their ability to impart force on the return stroke, may pull the lips as well, and in so doing, may also serve to emulate the action of muscles that move opposite to Orbicularis oris 82, such as, for example, Mentalis 83, or Depressor labii 81.

To emulate part of Orbicularis oris' 82 action that purses the lips, expression affector 5 may be used to move the corners of the lip in toward the center of the lips, and/or forward and out towards the front of the face. These actions are characteristic of expressions that may include "surprise", some expressions of anger and suspicion, and many speech-related movements. Alternatively, any other suitable means may be used to reproduce this action of this muscle group. If expression affector 5 is used to emulate this action, an anchor 34 may be embedded in the skin at the corner of the mouth. This anchor 34 may also, simultaneously, serve as an anchor 34 for other emulated muscle groups (such as, for example, Zygomaticus major 78). A substantially rigid linkage 35 may attach to the anchor 34, and then extend back through an opening in a mechanical frame 36 to attach to an actuator 33. When actuated, this linkage 35 may push on the anchor 34, which distributes force into the skin 25, causing the skin to project forward. This action may or may not be produced by the same linkage and actuator 33 that are used to emulate the action of Zygomaticus major 78, such that when the actuator 33 pulls on the linkage, the resulting motion emulates the action of Zygomaticus major 78, but when the actuator 33 pushes the linkage 35 outward, the resulting motion emulates the action of Orbicularis oris 82. Optionally, a drawstring of any suitable material may be embedded in the lips so that when pulled, it may decrease the diameter of the mouth opening to affect the appearance of pursing lips, emulating this action of the Orbicularis oris 82. Such a drawstring may also be given slack to allow the diameter of the mouth to increase for some expressions, such as, for example, a wide-open smile.

To emulate the action of Triangularis 84, which pulls the corners of the lips and nearby regions downward, expression affectors 5 may be used to pull the skin out into positions that are characteristic of expressions that may include "fear", "critical thinking", "grief", and some speech-related movements. Alternatively, any other suitable means may be used to reproduce the action of this muscle group. To emulate this muscle action by using expression affector 5, an anchor 34 may be embedded along the corner of the mouth, and may extend out into the cheek. The anchor 34, which may simultaneously serve as an anchor for other emulated muscle groups (such as, for example, Zygomaticus major 78), may be composed in part of cloth, and may extend some distance into the lips to reinforce the lips and the corner of the mouth, to prevent tearing. A flexible linkage 35 may run downward from the lower part of the anchor 34, to reach a part of a mechanical frame 36 at or near the jawline. At this point, the linkage 35 may bend around and run through a radiused opening present in the mechanical frame 36. From there, the linkage 35 may extend back into the cavity interior of the mechanical frame 36, where it may attach to an actuator 33 mounted to the mechanical frame 36. When actuated, the linkage 35 may be made to slide through the radiused opening, to pull the anchor 34 and skin downward so as to affect an expression like a frown.

To emulate the action of Nasalis 85, which pulls the regions along the sides of the nose into wrinkles, expression affectors 5 may be used to form the skin into positions that are characteristic of expressions that may include "sneering", "disgust", some forms of "anger" and "fear", and some forms of smiles and speech-related movements. Alternatively, any other suitable means may be used to reproduce the action of this muscle group. To emulate this muscle action by using expression affector 5, anchors 34 may be embedded along the sides of the nose. A flexible linkage 35 may run from the top of the anchor 34 upward on the bridge of the nose, to then bend around (and run through) a radiused opening present in a mechanical frame 36. From there, the linkage 35 may extend back into the cavity interior of the mechanical frame 36, where it may attach to an actuator 33 mounted to the mechanical frame 36. When actuated, the linkage 35 may be made to slide through the radiused opening, pulling the anchor 34 and skin upward so as to bunch into a "sneer".

To emulate the actions of the muscles of the jaw 87, an actuator 33 may be used to rotate the artificial jaw of the HER.

Following is discussion of how emulated muscle groups may be used in orchestration so as to represent 6 basic emotional expressions: "joy", "sorrow", "surprise", "anger", "fear", and "disgust". The actions of the emulated muscles-in regards to specific geometries of emulated muscle placement, the vectors of emulated muscle motion, and the paralinguistics of individual and orchestrated muscle actions-may also be customized to suit a given embodiment or to suit the desire of an engineer or artist. In the process of such customization, one may or may not refer to public literature of animation, anthropology, psychology, anatomy and physiology for design inspiration. The 6 simulated facial expressions in the following examples are chosen because they are identified by anthropologists as being universal, transcultural, and in regular use for human nonverbal communications. Alternatively, the described system of emulated facial muscles may be used to express other simulated cognitive states, intentions, emotions, thoughts, desires, affections, affectations, and/or simulated speech motions. In the given 6 examples, the extremity of action of each emulated muscle group may be modulated as desired so as to create subtle variation in the meanings of each expression. Also, some of the 6 basic expressions may be blended and actuated simultaneously so as to create complex, or mixed, expressions, such as, for example: joyous-surprise, or disgusted-anger. For the purpose of discussion, all emulated muscle actions may be presumed to be actuated to their non-destructive extremes, but in practice these actions may be modulated as desired.

The expression of "joy" may be achieved by actuating some or all of the following emulated muscle actions: Zygomaticus major 78 (pulling the lip corners outward and up), Zygomaticus minor 79 (raising the upper lip), Buccinator 80 (pulling the lips wide), Orbicularis oris 82 (raising the upper lip), Depressor labii 81(drawing the lower lip open and widening it), and Mentalis 83 (drawing the lower lip and chin downward). Optionally, to achieve a "truthful" or "Duchenne" smile, one may additionally actuate the emulated Orbicularis oculi 75 in the region under the eyes and at the edge of the eyes, and/or eyelid mechanism 11 to cause the lower eyelids to raise, so as to affect a "squint" of the eyes.

The expression of "sorrow" may be achieved by actuating some or all of the following emulated muscle actions: Triangularis 84 (frowning the corners of the mouth), Frontalis 73 (raising the center region of the forehead/brow), Orbicularis oris 82 (pushing the lower lip and projecting it forward), Mentalis 83 (pushing the lower lip upward), Orbicularis oculi 75 (pulling the arch of the eyebrows down and inward), and/or Corrugator 74 (furrowing the brow).

The expression of "surprise" may be achieved by actuating some or all of the following emulated muscle actions: Frontalis 73 (pulling all the forehead and eyebrows upward), eyelid mechanisms 11 (affecting "wide open" eyes), Depressor labii 81(pulling the lower lip down and drawing it outward), Platysma 86 (opening the jaw), and/or Mentalis 83 (pulling the lower lip down).

The expression of "fear" may be achieved by actuating some or all of the following emulated muscle actions: Zygomaticus major 78, Zygomaticus minor 79, Triangularis 84, Corrugator 74, Depressor labii 81, Frontalis 73, Procerus 76, Nasalis 85, Levator labii superioris 77, and/or the Mentalis 83.

The expression of "anger" may be achieved by actuating some or all of the following emulated muscle actions: Procerus 76 (dropping the brow into a scowl), Corrugator 74 (furrowing the brow), Zygomaticus minor 79 (sneering the upper lip), Nasalis 85 (sneering the nose), Triangularis 84 (frown), Depressor labii 81(dropping inner section of the lower lip), Orbicularis oris 82 (dropping the arch of the eyebrow, and scrunching the skin below the eye into a squint), eyelids (upper eyelids raise to open the eyes wider), and/or the Orbicularis oris 82 (pursing the lips, and raising the upper lip)

The expression of "disgust" may be achieved by actuating some or all of the following emulated muscle actions: Procerus 76, Zygomaticus minor 79, Nasalis 85, Triangularis 84, Orbicularis oris 82, Orbicularis oculi 75 (to scrunch the skin below the eyes into a squint), and/or the Mentalis 83.

FIG. 13 is a block diagram illustrating one embodiment of a control system configuration that may be used to emulate at least some human communication in an HER. In the depicted embodiment, video sensor 60 and audio sensor 67 in a HED 12 relay video and audio data into a computational system 88. One set of software and/or embedded hardware processes running in the computational space, called Automatic Speech Recognition (ASR) 89, processes the audio data to detect speech and extracts words and low-level linguistic meaning. Any suitable software may be used to accomplish ASR, including various available systems, such as, for example, Sphinx from Carnegie Mellon University or IBM's Viavoice. Another set of software and/or embedded hardware processes called Computer Vision 90 may perform any of various visual perception tasks using the video data. Such visual perception tasks may include the detection and tracking of the faces of people, using any suitable software, which may include various available software, such as, for example, SRI's People Tracker or Eyematic's FaceTracker. Other visual perception processes may also include the tracking of facial features or expressions on the faces of people and any suitable software may be used for this task, such as, for example, Eyematic's FaceStation. Decision processes 91 may be used to determine appropriate communicative responses and other behaviors and any suitable software may be used for this purpose such as, for example, any of the public or commercially available "chatbot" software, like "eliza" and "Alice." Alternatively, those skilled in the art may create software specific to the applications described above to implement the claimed invention. Other processes called special programs 92 may be any off-the-shelf or custom software that may be bundled with the HER, that include functions that enhance the HER for specific applications are not included in standard software, such as, for example: software that monitors vital functions in a patient, software that detects presence of chemical danger, and/or software that set off fire alarms or burglar alarms. Other processes called specific programs 93 may be used to enhance the functionality of the system in other ways. These specific programs 93 may be any off-the-shelf software that may be accessed by the HER, wherein the HER becomes a layer through which a user interacts with the specific programs; such software may include any, all, or none of the following: spreadsheet software, web-browsing software, email programs, word processing software, electronic books, expert systems, Artificial Intelligence software, mathematical software, geo-positioning software, and/or game software. Data storage 94 may be used to affect a long-term memory, build knowledge, and to store software. Speech responses may be synthesized by any suitable speech synthesis software 95 such as, for example, the open-source software "Festival", to be made audible using an audio transducer 70. Any suitable motor controller 96 may be used to effectuate non-verbal expressions in the HED 12. Nonverbal responses may operate independent of speech (in one embodiment, by direct mimicry), or in synchrony with the content of the synthesized speech.

The following section discusses flow of data through one embodiment of an HER control system. The cameras in the HED's eyes may send video signals into the computer vision module 90, which locates a human face in the video stream. The data regarding the position of this person may be sent on to decision processes 91, which may decide to react to the person in the video signal, based on variables that govern the HER's attention. If the HER decides to react to the perceived person, data will be sent to motor controller 96 regarding the anticipated position of the person. Motor control signals may travel to actuators 33 in the HED that control eye position, and optionally, to motors that govern head-pose, to make eye contact with the perceived person. Decision processes 91 may also send a signal to motor controller 96 to affect a smile of greeting; motor controller 96 may generate and send appropriate the signals to the actuators responsible for a joyful smile. Decision processes 91 may also send the signal to speech synthesis 95 to utter a greeting. Speech synthesis 95 may generate the corresponding speech greeting signal, and send this signal to an audio transducer 70 in the HED, to make the signal audible to a person. Upon these greeting gestures, the person may return greeting, and then request if any new email messages have been sent for the person. The microphones in the HED may detect the speech data, transmit the data to ASR 89, which may decipher the words, and may decipher some linguistic content. The resulting language analysis will be relayed to decision processes, which may further decipher the linguistic content, to understand the person's request. Decision processes may summon special programs 92 dedicated to personal assistant functions, to translate the request for email into appropriate web-browsing functions. Special programs 92 may then send signals to specific programs 93, which open the appropriate servers and URLs on the Internet, to open the person's email account. Special programs 92 then decipher the hypertext of the messages to determine what email messages are new, and returns this data to decision processes 91, which puts the information into natural language, which is relayed to speech synthesis 95, which then generates speech signals that are relayed to the audio transducer 70 in the HED. The transmission of this audible signal completes the control loop. During the described transactions, all data may be relayed from decision processes, special programs, and specific programs, to data storage 94, where it may be recorded for future reference as needed. Data storage 94 may also serve to store software that is not actively used, to be summoned into active duty as needed, to conserve processing resources.

Figure 14:
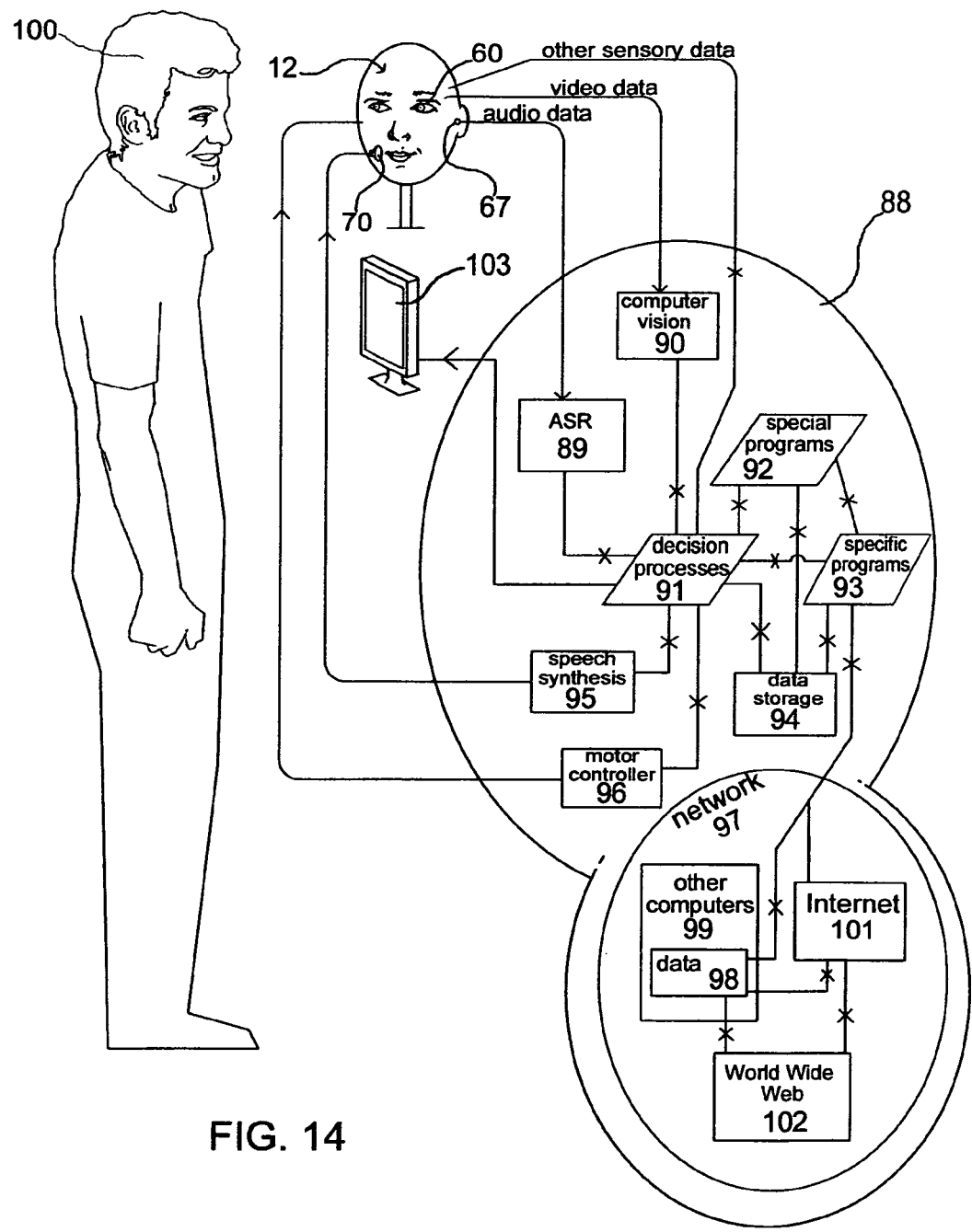
FIG. 14 is a block diagram illustrating an embodiment of a Human Emulation Robot being used to access, navigate, or modify the information present on a computer network.

FIG. 14 is a block diagram illustrating an embodiment of a Human Emulation Robot being used to access, navigate, or modify the information present on a computer network. This embodiment of a Human Emulation Robot 1 comprises an expressive, human-appearing mechanism 12, and a computer system to generate interactive, human-like conversation in said mechanism 13, wherein said computer connects to a computer network 97 in such a way that said computer can access data 98 present in other computers 99. This data is then translated into emulated natural conversation for the human user 100. In one embodiment, a user 100 may ask the Human Emulation Robot 1 if one has any new email, which may cause the Human Emulation Robot 1 to access the user's email via the Internet 101. The Human Emulation Robot 1 may then announce in natural language, "Yes, you have new email from your grandmother". To which the user 100 may then inquire, "Well, what does she say?", which may cause the Human Emulation Robot 1 to recite the message to the user 100. In another embodiment, the Human Emulation Robot 1 may find an encyclopedia article from the World Wide Web 102 at the spoken behest of a user 100, and recite the article in synthesized spoken language. Alternatively, the HER may simply help locate the article and the article may be displayed on a screen 103 for the user to read. The HER could be used as a computer interface in any number of ways. Speech recognition is currently used in various computer interface applications and the HER could be used in all of these ways. The HER could serve as a virtual secretary and take dictation of a letter that ends up in a word-processing program. Rather than simply sounding a tone when an error occurs, however, the HER could say that an error has occurred and explain what the error is, thus enhancing the user's experience and making the computer easier to use. The HER could serve as a "desktop" assistant which interacts with the user using natural language in order to navigate, access, open, and modify applications, documents, and system software on a computer. In this case, the HER may verbally describe file names, actions that may be taken, and interpret contents of files. Alternatively, the HER may simply help the user to locate files and then display the files on a screen. The HER could serve as a virtual personal assistant, by helping to organize the files on a computer, in response to natural dialogue and visual gestures from the user. The HER could furthermore serve as a virtual personal assistant, by managing one's schedule, taking memo notes, and reminding one of impending appointments, events, and important dates. In expanded roles as a virtual personal assistant, the HER could access various natural-language ticketing agents, sales agents, search-bots, and other natural language agents that are increasingly common on the World Wide Web and elsewhere in commerce, allowing the user to book tickets, search for answers to questions, and so on. The natural language of these agents could be interpreted and presented by the HER so as to maintain the natural flow of the user's dialogue with the HER. In so doing, the HER may provide a face for these outside, automated agents, and these agents may expand the intelligent capabilities of the HER. The HER could serve as an alternative display for various computer-generated characters (the HER being three-dimensional and physically embodied as opposed to "virtual" imagery on a display screen) for animated agents, "chatterbots", or avatars. In one such embodiment, the HER could serve as an interface to a video game, such that the HER becomes controlled by a video-game character. In essence, the character possesses the body of the HER, and in so doing, comes to exist outside of the game, in our physically-embodied world, thus enhancing the experience of the video-game user, and opening many new possibilities in video-game design.

Figure 15:
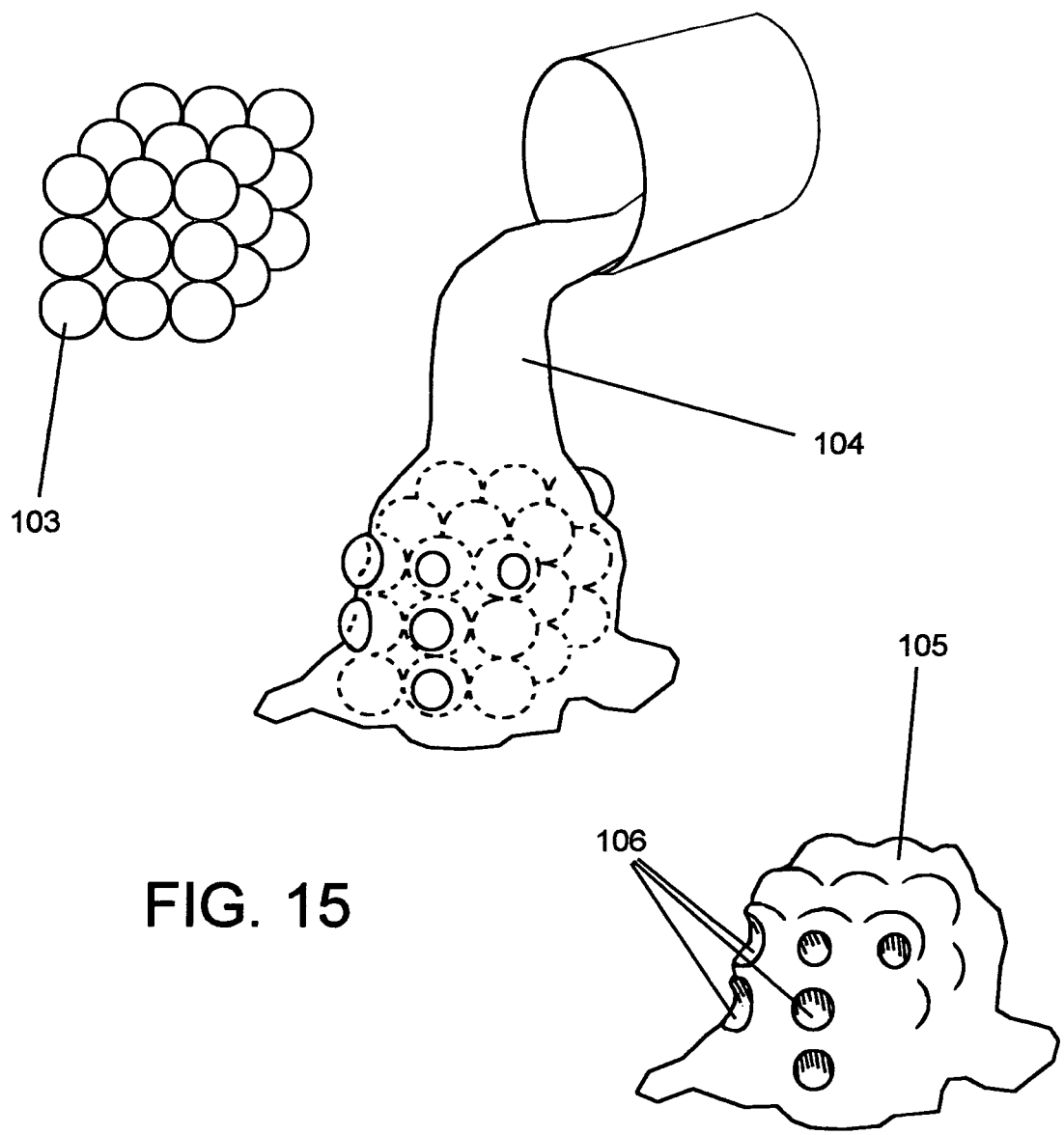
FIG. 15 is a block diagram illustrating a method for producing an artificial skin material.

FIG. 15 is a block diagram illustrating a method for producing an artificial skin material, comprising: building a three dimensional matrix 103 made of removable material, perfusing the matrix with elastomer 104 that is not as easily removable as said removable material, and removing the matrix to leave behind a web of elastomer 105 that is permeated by at least one network of voids 106, wherein the web of elastomer is flexibly compressible while maintaining at least some elastic characteristics. Various details and options related to this method were discussed above.

Although the present invention has been described in detail, it should be understood that various changes, substitutions and alterations can be made hereto without departing from the sphere and scope of the invention as defined by the appended claims.

To aid the patent office, and any readers of any patent issued on this application in interpreting the claims appended hereto, applicants wish to note that they do not intend any of the appended claims to invoke paragraph 6 of 35 U.S.C. §112 as it exists on the date of filing hereof unless "means for" or "step for" are used in the particular claim.

I claim:

1. A human emulation robot system, comprising:
a mobile mechanical frame;
an artificial skin mounted on the exterior of the mechanical frame, the artificial skin comprising discrete, microscopic sections of foamed and unfoamed elastomers;
one or more actuators coupled to the mechanical frame and operable to manipulate the artificial skin; and
a control system operable to control the manipulation of the artificial skin by the one or more actuators.

2. The system of claim 1, further comprising a power supply operable to supply power to the one or more actuators and control system.

3. The system of claim 2, wherein the power supply is coupled to and mounted within the mechanical frame.

4. The system of claim 1, wherein the control system is coupled to and mounted within the mechanical frame.

5. The system of claim 1, wherein the mechanical frame is untethered from external devices.

6. The system of claim 1, wherein the mechanical frame comprises one or more wheels operable to transport the mechanical frame.

7. The system of claim 1, wherein the mobile mechanical frame comprises one or more legs operable to transport the mechanical frame.

8. The system of claim 1, wherein at least a portion of the artificial skin resembles at least a portion of a human face.

9. The system of claim 1, wherein the control system is operable to cause the actuators to manipulate the artificial skin to emulate a human facial expression.

10. The system of claim 1, further comprising:
a video camera operable capture image input; and
image processing logic operable to determine whether a human face is present in the image input and identify at least one expression on the human face.

11. The system of claim 10, wherein the control system is operable to cause the actuators to manipulate the artificial skin to emulate the expression identified by the image processing software.

12. The system of claim 1, further comprising:
a microphone operable to capture audio input; and
voice recognition logic operable to determine one or more phrases in the audio input.

13. The system of claim 12, further comprising:
audio response logic operable determine a response to the one or more phrases determined by the voice recognition logic; and
an audio speaker operable to audibilize the response determined by the audio response logic.

14. A method for constructing a human emulation robot, comprising:
mounting one or more actuators on a mobile mechanical frame;
mounting an artificial skin on the exterior of a mobile mechanical frame, the artificial skin comprising discrete, microscopic sections of foamed and unfoamed elastomers; and
controlling the one or more actuators to manipulate the artificial skin.

15. The method of claim 14, wherein controlling the one or more actuators to manipulate the artificial skin comprises controlling the one or more actuators to manipulate the artificial skin to emulate a human facial expression.

16. The method of claim 14, wherein at least a portion of the artificial skin resembles at least a portion of a human face.

17. The method of claim 14, further comprising:
capturing image input using a video camera coupled to the mechanical frame; and
determining whether a human face is present in the image input;
identifying at least one expression on the human face; and
controlling the one or more actuators to manipulate the artificial skin to emulate the expression identified by the image processing software.

18. The method of claim 14, further comprising:
capturing audio input using a microphone couple to the mechanical frame;
determining one or more phrases in the audio input;
determining a response to the one or more phrases in the audio input; and
audibilizing the response through an audio speaker coupled to the mechanical frame.

19. The method of claim 14, wherein the mechanical frame is untethered from external devices.

20. A human emulation robot system, comprising:
a mobile mechanical frame;
an artificial skin mounted on the exterior of the mechanical frame, the artificial skin comprising discrete, microscopic sections of foamed and unfoamed elastomers;
one or more actuators coupled to the mechanical frame and operable to manipulate the artificial skin;
a video camera coupled to the mechanical frame and operable capture image input;
image processing logic operable to determine whether a human face is present in the image input and identify at least one expression on the human face; and
control logic operable to control the one or more actuators to manipulate the artificial skin to emulate the expression identified by the image processing logic.

* * * * *